US009711176B2

(12) United States Patent
Kitahara et al.

(10) Patent No.: US 9,711,176 B2
(45) Date of Patent: Jul. 18, 2017

(54) MULTILAYER OPTICAL INFORMATION RECORDING DISK AND METHOD FOR MANUFACTURING SAME

(71) Applicant: FUJIFILM Corporation, Tokyo (JP)

(72) Inventors: Toshiyuki Kitahara, Odawara (JP); Tatsuo Mikami, Odawara (JP); Atsushi Tatsugawa, Odawara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 22 days.

(21) Appl. No.: 14/796,221

(22) Filed: Jul. 10, 2015

(65) Prior Publication Data
US 2015/0318013 A1    Nov. 5, 2015

Related U.S. Application Data

(63) Continuation of application No. PCT/JP2013/083436, filed on Dec. 13, 2013.

(30) Foreign Application Priority Data

Jan. 11, 2013  (JP) ................................. 2013-003310

(51) Int. Cl.
*G11B 7/24* (2013.01)
*G11B 7/256* (2006.01)
(Continued)

(52) U.S. Cl.
CPC ................ *G11B 7/256* (2013.01); *B32B 3/30* (2013.01); *B32B 7/02* (2013.01); *B32B 7/06* (2013.01);
(Continued)

(58) Field of Classification Search
CPC ........... G11B 7/007; G11B 7/24; G11B 7/244; G11B 7/245; G11B 7/263; G11B 7/24038; G11B 7/24073
See application file for complete search history.

(56) References Cited

U.S. PATENT DOCUMENTS 5,141,785 A * 8/1992 Yoshinada ............. G11B 7/003
346/135.1
2006/0204706 A1    9/2006 Horie et al.
(Continued)

FOREIGN PATENT DOCUMENTS

JP    2007-026541 A    2/2007
JP    2009-241307 A    10/2009
(Continued)

OTHER PUBLICATIONS

Mikami, Tatsuo et al., "20-Layer Optical Disc Fabricated with web coating and laminating process", Th-M-01, ISOM'12 (2012), pp. 200-201.
(Continued)

*Primary Examiner* — Elizabeth Mulvaney
(74) *Attorney, Agent, or Firm* — Sughrue Mion, PLLC

(57) ABSTRACT

A multilayer optical information recording disk comprising a plurality of recording layers and intermediate layers provided between the plurality of recording layers, and a method for manufacturing the same are provided. At least one of two intermediate layers disposed adjacent to respective sides of one recording layer is made of adhesive. Each of the recording layers includes a polymer binder and a dye dispersed in the polymer binder or includes a polymer to which a dye is bonded. Each recording layer is configured such that the dye absorbs a recording beam and generates heat which deforms the recording layer, causing an interface between the recording layer and the intermediate layer made of adhesive to have a protrusive shape protruding into the (Continued)

intermediate layer, thereby recording information thereat. The interface between the recording layer and the recording layer made of adhesive has a groove for track-following servo control.

10 Claims, 13 Drawing Sheets

(51) Int. Cl.
    *B32B 3/30*     (2006.01)
    *B32B 7/02*     (2006.01)
    *B32B 7/12*     (2006.01)
    *B32B 37/26*     (2006.01)
    *G11B 7/24038*     (2013.01)
    *G11B 7/245*     (2006.01)
    *G11B 7/246*     (2013.01)
    *G11B 7/24067*     (2013.01)
    *G11B 7/24073*     (2013.01)
    *G11B 7/26*     (2006.01)
    *B32B 38/06*     (2006.01)
    *B32B 7/06*     (2006.01)
    *B32B 27/08*     (2006.01)
    *B32B 27/20*     (2006.01)
    *B32B 27/30*     (2006.01)
    *B32B 37/24*     (2006.01)
    *B32B 37/12*     (2006.01)
    *B32B 38/00*     (2006.01)
    *B32B 38/10*     (2006.01)
    *B32B 37/02*     (2006.01)
    *B32B 38/18*     (2006.01)
(52) U.S. Cl.
    CPC ................ *B32B 7/12* (2013.01); *B32B 27/08* (2013.01); *B32B 27/20* (2013.01); *B32B 27/306* (2013.01); *B32B 27/308* (2013.01); *B32B 37/26* (2013.01); *B32B 38/06* (2013.01); *G11B 7/245* (2013.01); *G11B 7/246* (2013.01); *G11B 7/24038* (2013.01); *G11B 7/24067* (2013.01); *G11B 7/24073* (2013.01); *G11B 7/263* (2013.01); *B32B 37/02* (2013.01); *B32B 37/12* (2013.01); *B32B 37/1284* (2013.01); *B32B 37/24* (2013.01); *B32B 38/0004* (2013.01); *B32B 38/10* (2013.01); *B32B 38/1841* (2013.01); *B32B 2037/243* (2013.01); *B32B 2037/268* (2013.01); *B32B 2307/4026* (2013.01); *B32B 2307/418* (2013.01); *B32B 2307/748* (2013.01); *B32B 2429/02* (2013.01); *Y10T 156/1039* (2015.01)

(56) References Cited

U.S. PATENT DOCUMENTS

2013/0128715 A1     5/2013     Kitahara
2014/0120295 A1     5/2014     Mochizuki et al.

FOREIGN PATENT DOCUMENTS

JP     2012-022738 A     2/2012
JP     2013-020681 A     1/2013

OTHER PUBLICATIONS

International Search Report of PCT/JP2013/083436 dated Mar. 18, 2014 [PCT/ISA/210], 5 pages of English and Japanese Documents.
Written Opinion of PCT/JP2013/083436 dated Mar. 18, 2014 [PCT/ISA/237], 3 pages of Japanese documents.
Mikami, Tatsuo, "20-Layer Optical Disc Fabricated with web coating and laminating process", Th-M-01, ISOM' 12, pp. 200-201, Sep. 30, 2012.
Communication dated Jun. 28, 2016, from the Japanese Patent Office in counterpart application No. 2014-556347.

* cited by examiner

FIG.4
(a)
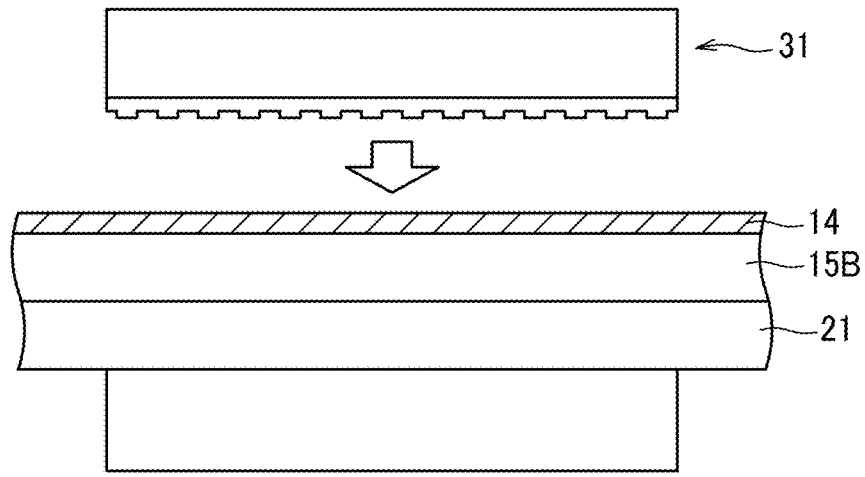
(b)
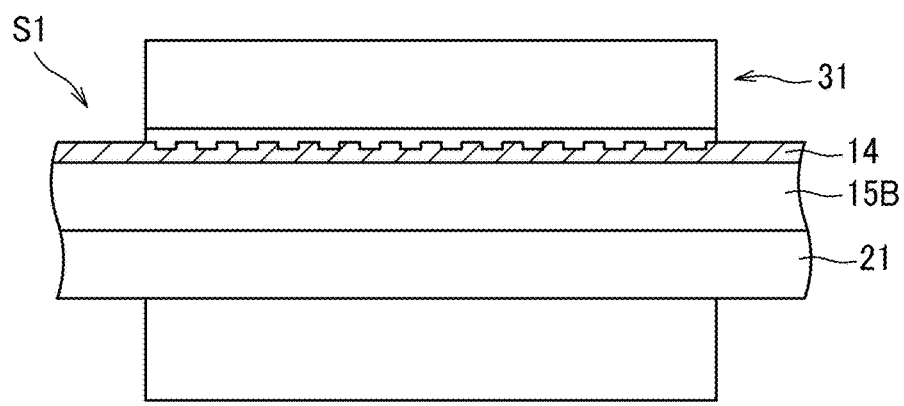
(c)
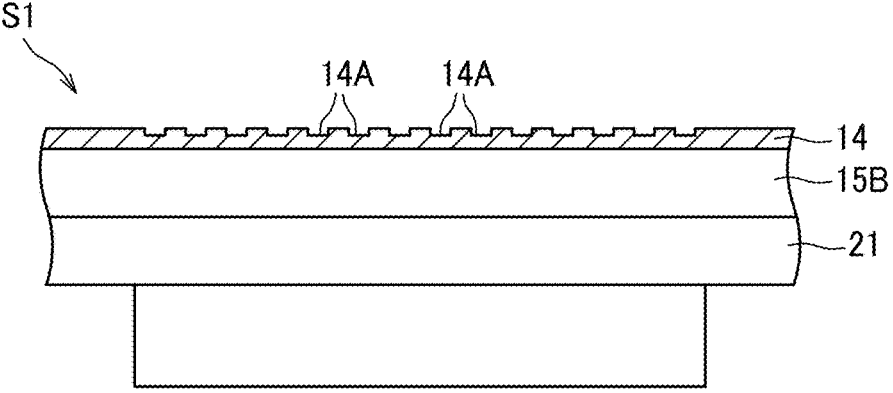

FIG.6
(a)
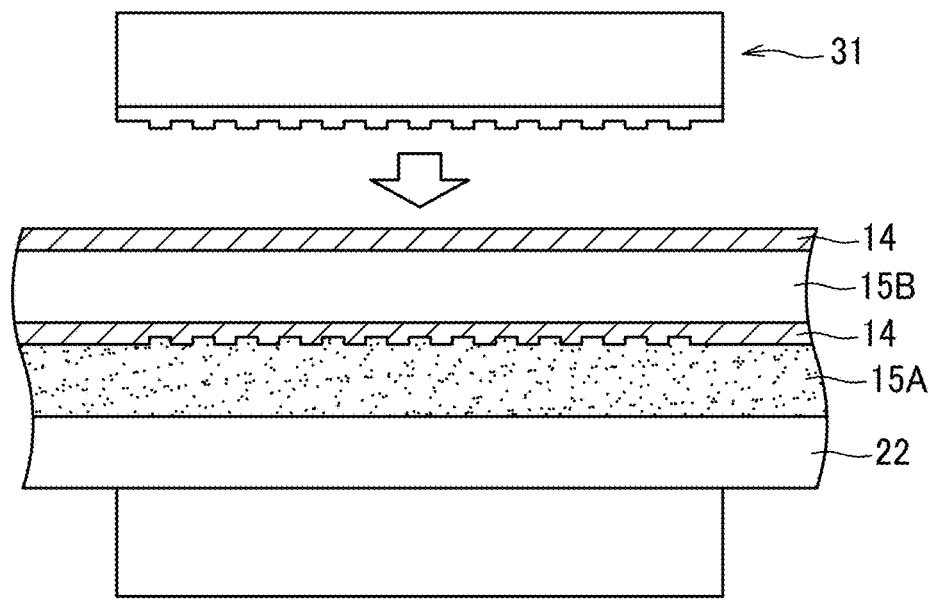
(b)
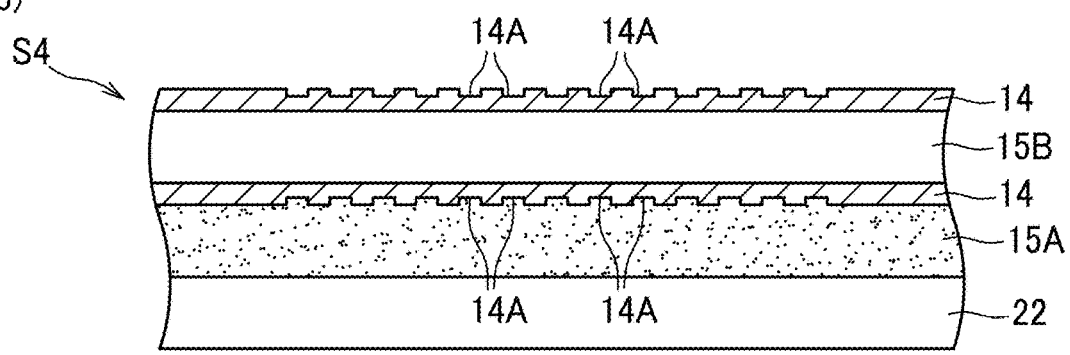

FIG.8
(a)
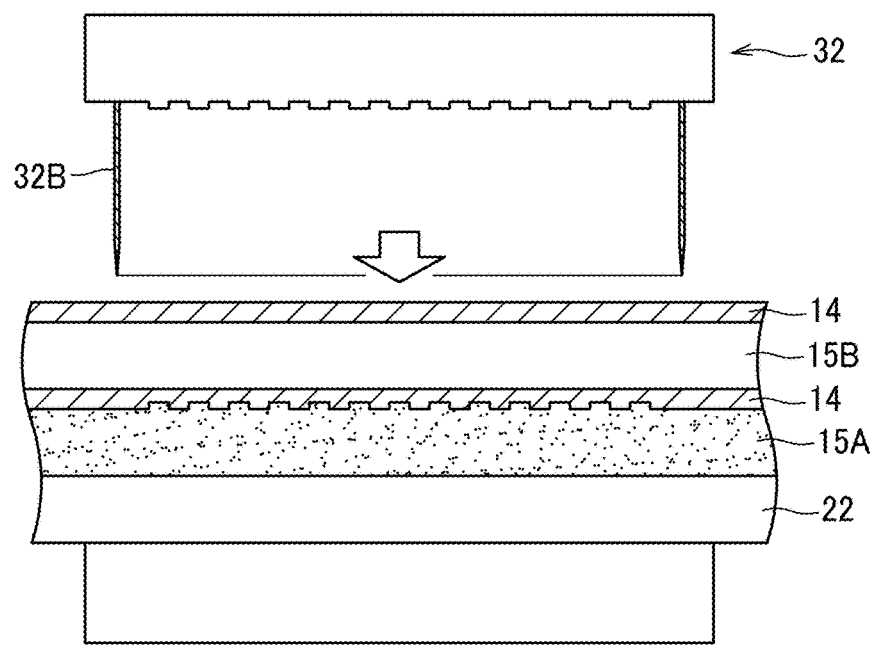
(b)
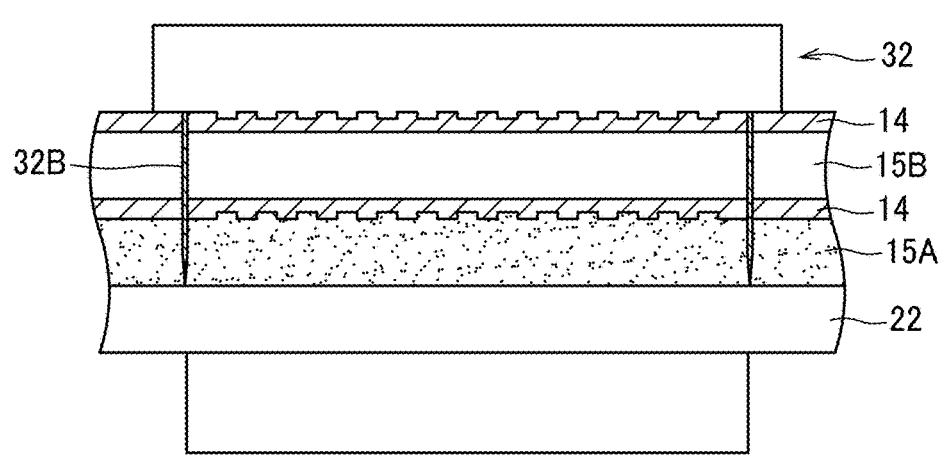
(c)
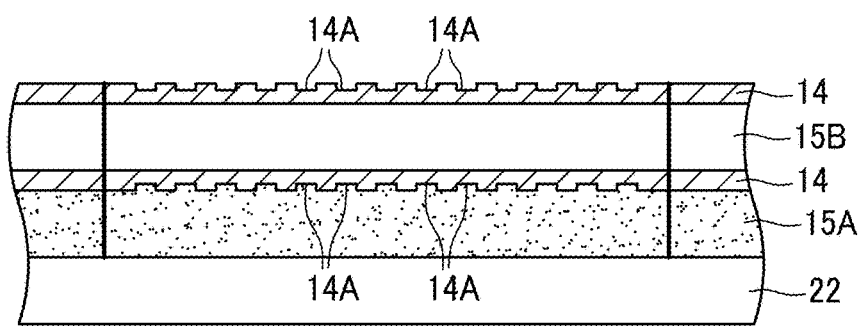

FIG.11
(a)
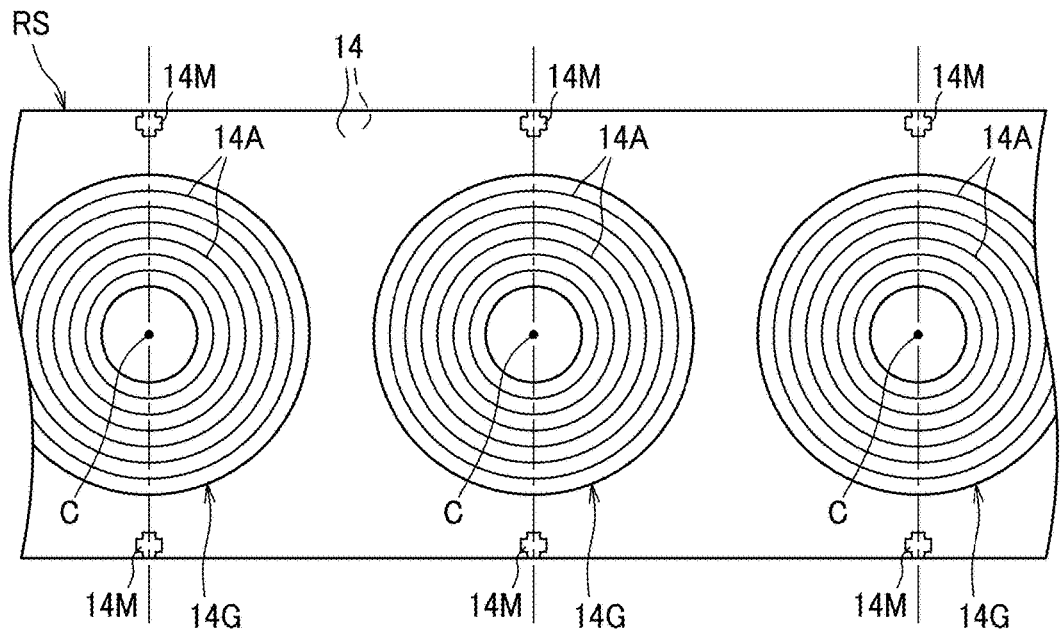
(b)
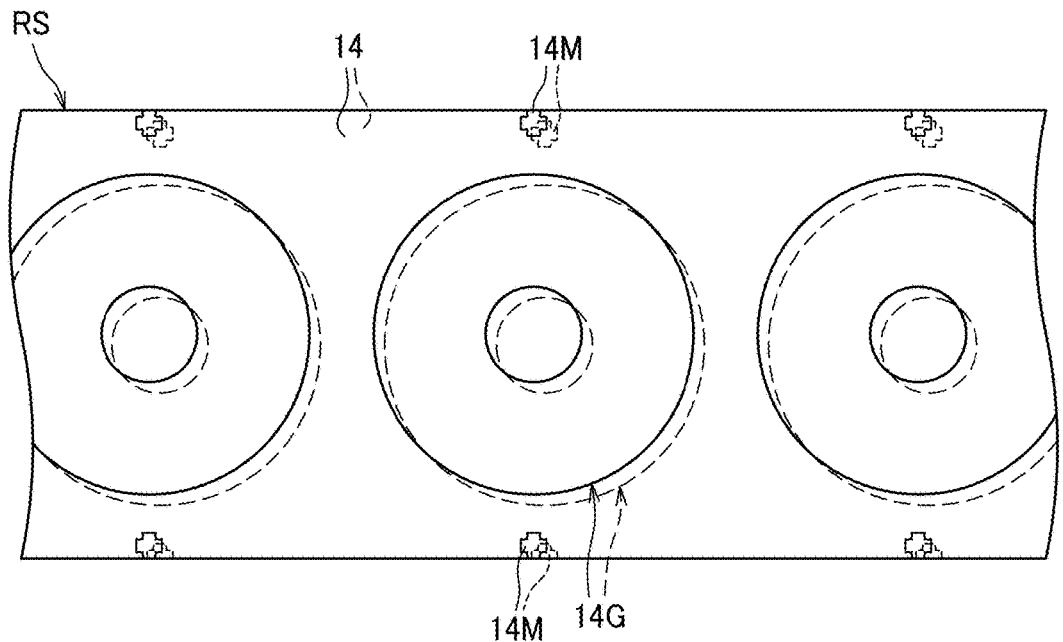

FIG.12
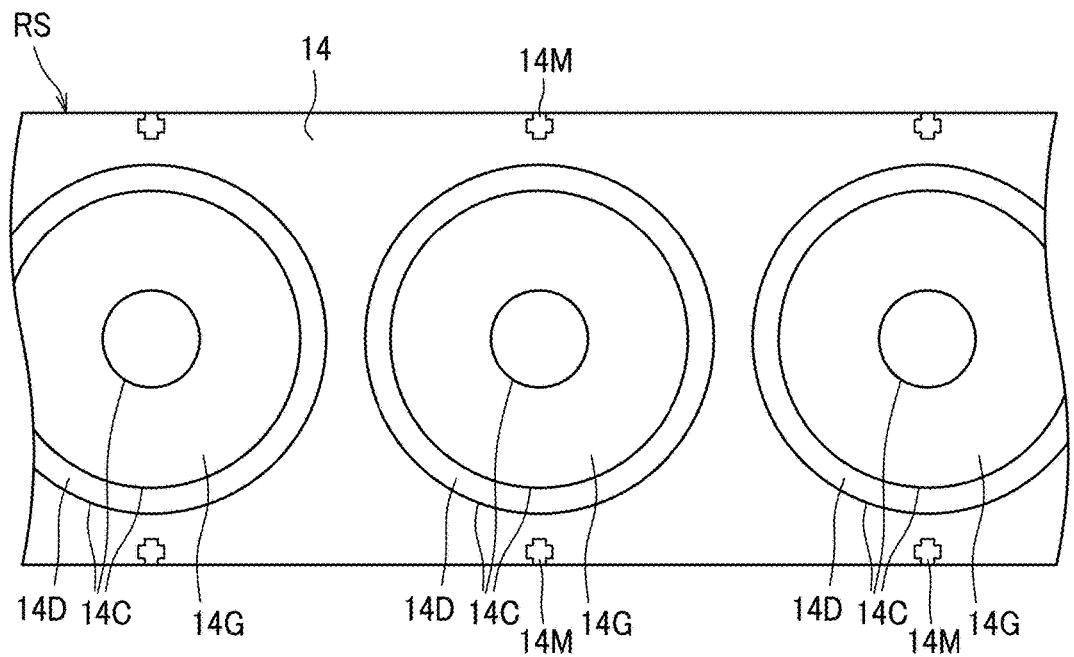
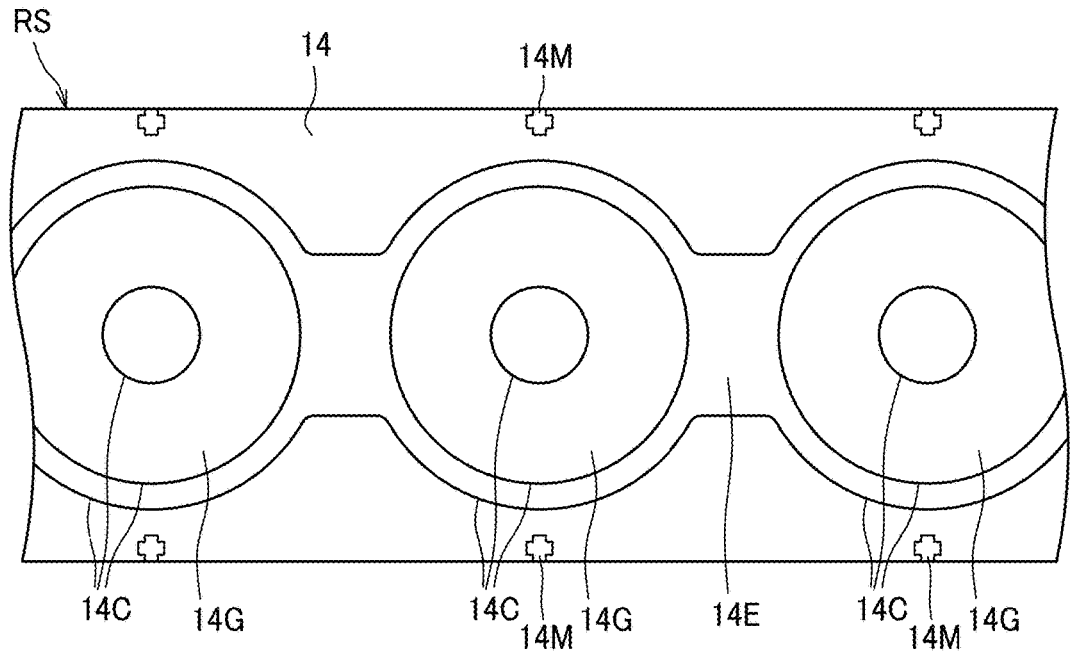

FIG.13
(a)
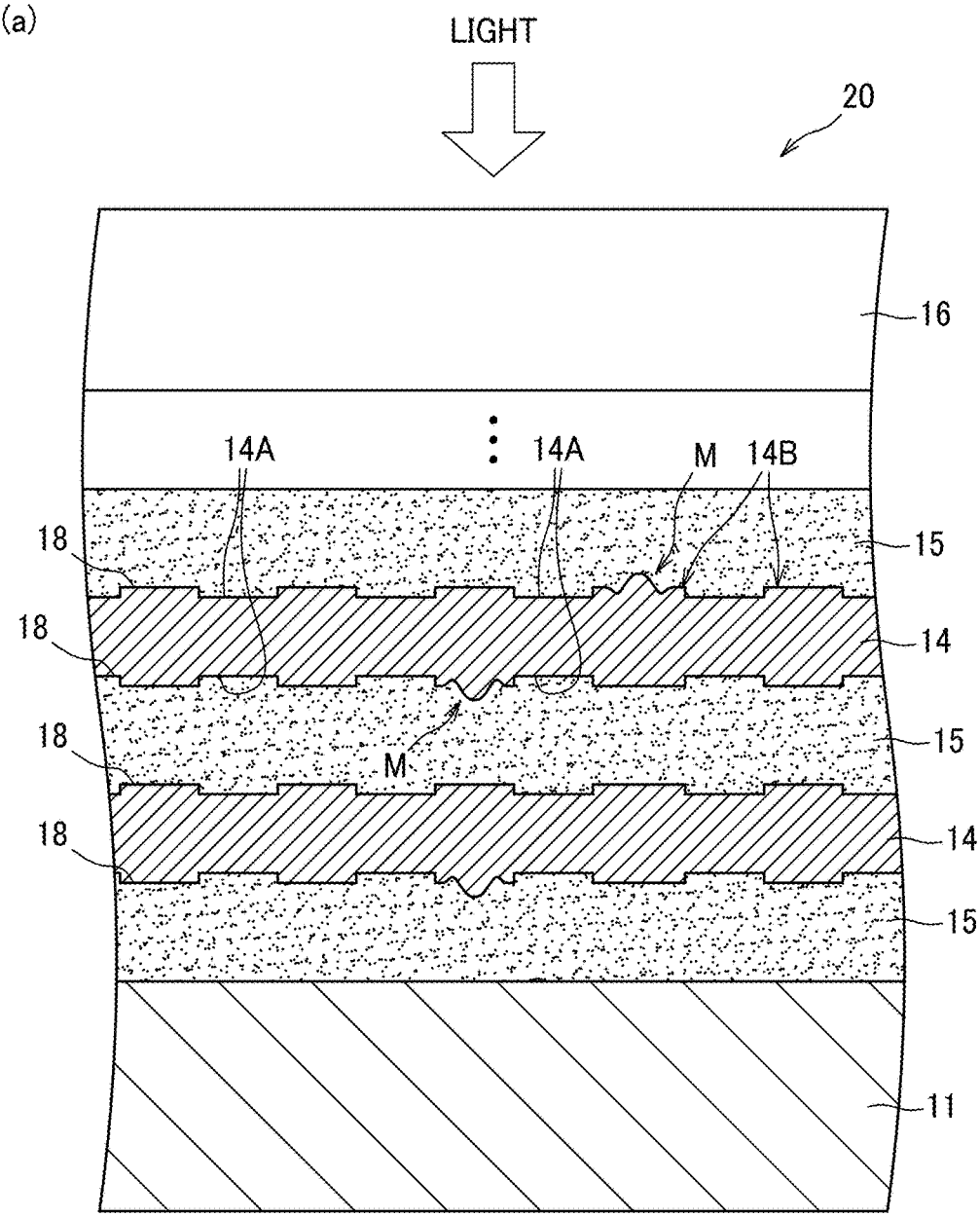
(b)
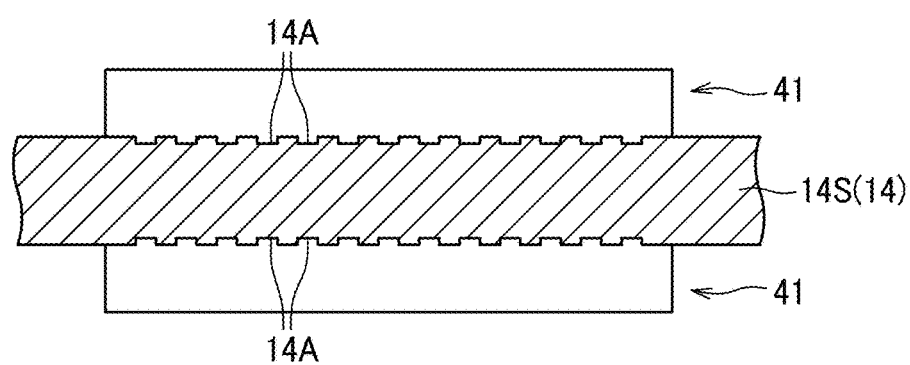

FIG. 14
(a)
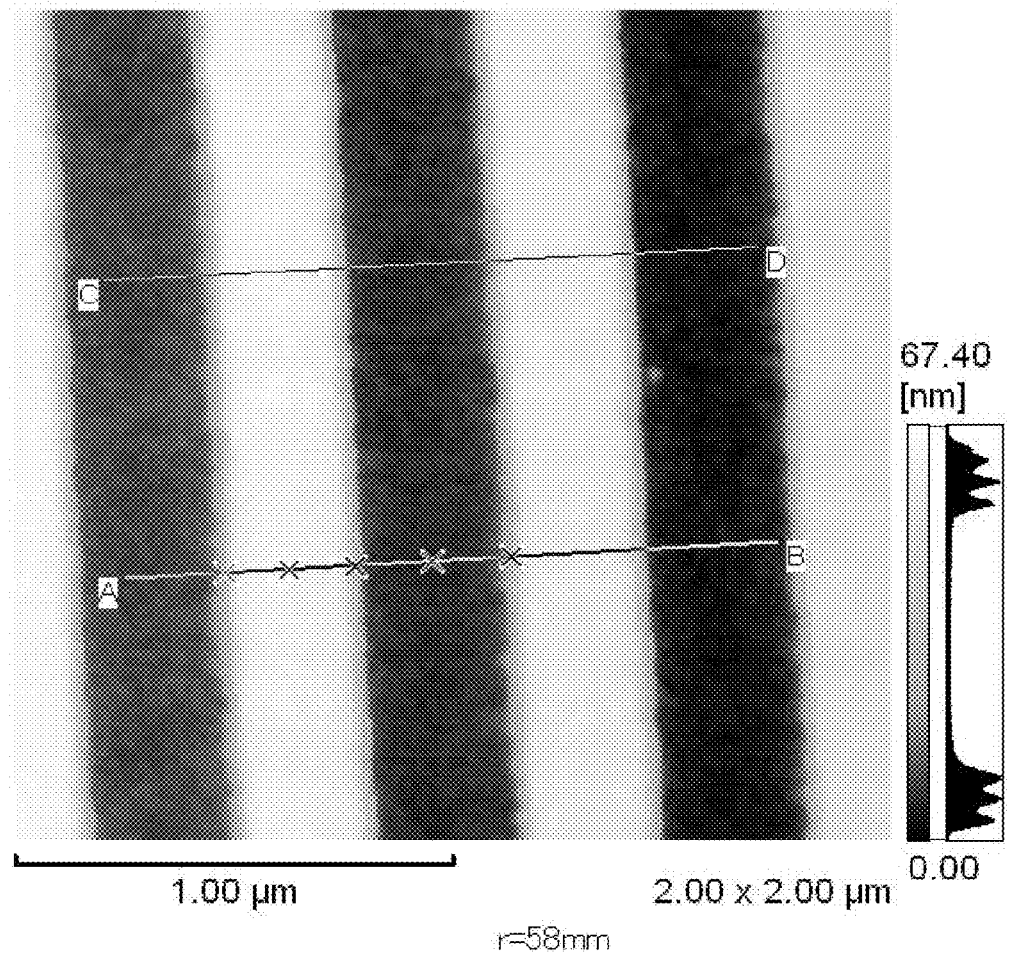
(b)
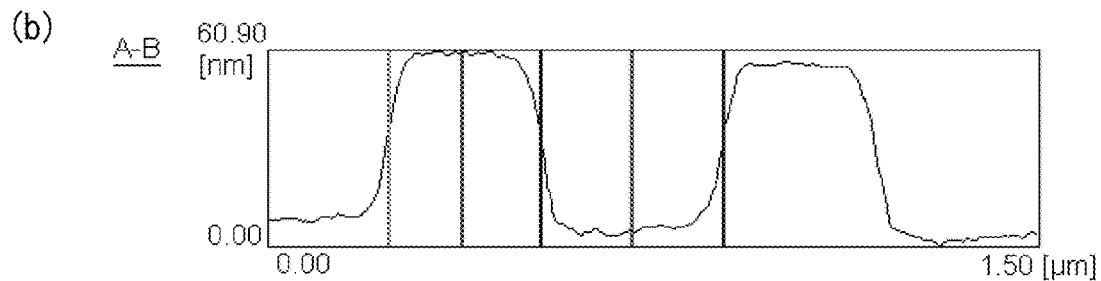

MULTILAYER OPTICAL INFORMATION RECORDING DISK AND METHOD FOR MANUFACTURING SAME

CROSS-REFERENCE TO RELATED APPLICATION(S)

This application is a continuation of International Application No. PCT/JP2013/083436 filed on Dec. 13, 2013, which claims priority from Japanese Patent Application No. 2013-003310 filed on Jan. 11, 2013 in the Japan Patent Office, the disclosure of which is herein incorporated by reference in its entirety.

BACKGROUND

1. Field

The present invention relates to a multilayer optical information recording disk and a method for manufacturing the same.

2. Description of Related Art

In recent years, as a technique for increase in capacity of an optical information recording disk, multi-layering of recording layers for recording information has been a focus of study. For example, Non-patent Literature 1 discloses a technique for realizing multi-layering of recording layers, wherein a sheet having two recording layers and two intermediate layers is prepared and stamped into a disk shape, and thus-formed disk-like sheets are laminated on a substrate having a guide layer for track-following servo control, one on top of another.

CITATION LIST

Patent Literature(S)

Non-patent Literature 1: Tatsuo Mikami et al., "20-Layer Optical Disc Fabricated with Web Coating and Laminating Process", Th-M-01, ISOM'12, p. 200-201.

SUMMARY

A conventional multilayer optical information recording disk having a multilayered recording layers includes a guide layer separate from the recording layers, and thus requires at least two beams of laser light for tracking servo, recording and reading to be applied to the disk, which would disadvantageously make the optics of the recording/reading system and its control process complex. For this reason, a conventional system using one laser beam for tracking, recording and reading information on an optical information recording disk cannot be used to record or read information in the multilayer optical information recording disk.

Another disadvantage in the conventional multilayer optical information recording disk is also due to separation of the guide layer from the recording layers, which would make it difficult to accurately trace the tracks in the recording layers under the influence of warpage of the disk or change in the position of the disk effected when the disk is loaded or ejected; for example, after recording is performed halfway at a specific position in one recording layer, subsequent recording from that specific position in the recording layer would be difficult.

The present invention has been made in view of the above-described background, and it is one aspect of the present invention to provide a multilayer optical information recording disk and a method for manufacturing the same, in which tracking, recording and reading using one laser beam can be performed and the tracks in the recording layers can be traced accurately.

To be more specific, according to one or more of embodiments of the present invention, a multilayer optical information recording disk is provided which comprises a plurality of recording layers and intermediate layers provided between the plurality of recording layers. At least one of two intermediate layers disposed adjacent to respective sides of one recording layer is made of adhesive. Each of the recording layers includes a polymer binder and a dye dispersed in the polymer binder or includes a polymer to which a dye is bonded. Each recording layer is configured such that the dye absorbs a recording beam and generates heat which deforms the recording layer, causing an interface between the recording layer and the intermediate layer made of adhesive to include a portion having a protrusive shape protruding into the intermediate layer, thereby recording information thereat. The interface between each of the recording layers and the intermediate layer made of adhesive has a groove for track-following servo control.

With this configuration, in which the groove for track-following servo control is formed for each recording layer, the track-following servo control and the recording/reading operation for the recording layer can be performed by a single laser beam. Moreover, the groove for track-following servo control provided for each recording layer enables accurate tracing of the tracks in the recording layers.

In the above-described multilayer optical information recording disk, additionally, the intermediate layers may include first and second intermediate layers disposed adjacent to first and second sides, respectively, of the plurality of recording layers, the first intermediate layer being made of adhesive, and the second intermediate layer being harder than the first intermediate layer.

With this additional feature, the protrusive shape can be formed easily at an interface between a recording layer and one of two intermediate layers disposed adjacent to respective sides of the recording layer (i.e., first intermediate layer).

In the above-described multilayer optical information recording disk, with or without the additional feature, the refractive indices of the recording layers and the first and second intermediate layers may, preferably but not necessarily, be adjusted such that a difference in refractive index between the recording and first intermediate layers is greater than a difference in refractive index between the recording and second intermediate layers.

With this additional feature, the interface between the recording and first intermediate layers which is used to form a protrusive shape (to record information) can be made relatively higher in reflectance (reflectivity) because the difference in refractive index between the materials at both sides of this interface is greater, so that information can be made easily retrievable. On the other hand, the interface between the recording and second intermediate layers which is not used to form a protrusive shape (to record information) does not have to be made higher in reflectance, and thus may be made relatively lower in reflectance by making smaller the difference in refractive index between the materials at both sides of this interface as with this additional feature, so that transmittance for a beam for use in recording and/or reading information (hereinafter referred to as "recording/reading beam") at this interface, specifically, the transmittance for the recording/reading beam at both interfaces (fraction of radiant energy of the beam that passes through the materials until it reaches the target interface for recording/reading information) can be made higher. This would advantageously make it possible to increase the number of recording layers to thereby increase the storage capacity, because when the number of recording layers should be increased, this configuration allows the beam to reach deeper recording layers that are the layers farther from a source of the recording/reading beam.

In the above-described multilayer optical information recording disk, with or without the additional features mentioned above, refractive indices of the recording and second intermediate layers may be substantially the same.

With this additional feature, the interface between the recording and second intermediate layers which is not used to form a protrusive shape (to record information) can be made substantially zero; this would advantageously make it possible to increase the number of recording layers to thereby increase the storage capacity, because when the number of recording layers should be increased, this configuration allows the beam to reach deeper recording layers that is the layers farther from a source of the recording/reading beam.

The above-described multilayer optical information recording disk, with or without the additional features mentioned above, may further be configured such that the intermediate layers disposed adjacent to both sides of the plurality of recording layers are made of adhesive, and the intermediate layers made of adhesive and the recording layers are alternately arranged.

With this additional feature, the protrusive shape can be formed at two interfaces on the both sides of each recording layer. Thus, if the number of recording layers is the same as that of the disk in which the protrusive shape is formed at only one of the interfaces on the sides of each recording layer, the storage capacity can be increased remarkably in comparison with this disk. Even if the number of recording layers is smaller than that of the disk in which the protrusive shape is formed at only one of the interfaces on the sides of each recording layer, the storage capacity comparative to that of this disk can be achieved.

In another aspect, a method for manufacturing a multilayer optical information recording disk is provided. The method for manufacturing a multilayer optical information recording disk described above with or without one or more of the additional features, as proposed herein, comprises the steps of: forming the groove in a surface of each of the plurality of recording layers by a thermal imprint process; forming an intermediate layer made of adhesive, on the surface of each of the plurality of recording layers with the groove formed therein, to obtain multilayer sheets each consisting essentially of one recording layer and one intermediate layer; and laminating the multilayer sheets together.

In still another aspect, a method for manufacturing a multilayer optical information recording disk in which the intermediate layers include first and second intermediate layers as described above is disclosed. The method for manufacturing such a multilayer optical information recording disk with or without one or more of the additional features, as proposed herein, comprises the steps of: providing a first release sheet and a second release sheet; forming a second intermediate layer and a first recording layer in this order on the first release sheet; forming the groove in a surface of the first recording layer by a thermal imprint process to obtain a first sheet; forming a first intermediate layer on the second release sheet to obtain a second sheet; laminating the first intermediate layer and the first recording layer, thereby forming a laminate consisting of the second sheet and the first sheet to obtain a third sheet; removing the first release sheet from the third sheet, and forming a second recording layer on an exposed surface of the second intermediate layer of the third sheet; forming the groove in an exposed surface of the second recording layer by the thermal imprint process to obtain a fourth sheet; and removing the second release sheet from the fourth sheet, and laminating, on an exposed surface of the first intermediate layer of the fourth sheet, a second recording layer of another fourth sheet.

In yet another aspect, an alternative method for manufacturing a multilayer optical information recording disk in which the intermediate layers include first and second intermediate layers as described above is disclosed. The method for manufacturing such a multilayer optical information recording disk with or without one or more of the additional features, as proposed herein, comprises the steps of: providing a second intermediate layer and a release sheet; forming first and second recording layers on respective sides of the second intermediate layer; forming the groove in a surface of each of the first and second recording layers concurrently by a thermal imprint process; forming a first intermediate layer on the release sheet to obtain a fifth sheet; laminating the first intermediate layer of the fifth sheet on the first recording layer to obtain a sixth sheet; and removing the release sheet from the sixth sheet, and laminating, on an exposed surface of the first intermediate layer of the sixth sheet, a second recording layer of another sixth sheet.

With these methods described above, a multilayer optical information recording disk in which each of the recording layers has a groove for track-following servo control can be manufactured; thus, the track-following servo control and the recording/reading operation for the recording layer can be performed by a single laser beam, and the groove for track-following servo control provided for each recording layer enables accurate tracing of the tracks in the recording layers. Moreover, since the groove can be formed in each recording layer easily by the thermal imprint process, the multilayer optical information recording disk in which each of the recording layers has a groove for track-following servo control can be manufactured at a relatively low cost.

In the above-described method for manufacturing a multilayer optical information recording disk, with or without additional features, the thermal imprint process may include heating at least one of an imprint mold and a corresponding recording layer up to a temperature range of Tg±25° C. where Tg is a glass transition temperature of the recording layer in degrees Celsius.

In the above-described method for manufacturing a multilayer optical information recording disk, with or without additional features, the thermal imprint process may include pressing an imprint mold against a corresponding recording layer at a pressure not lower than 0.1 MPa.

In the above-described method for manufacturing a multilayer optical information recording disk, with or without additional features, the step carried out to obtain the fourth sheet may include the steps of (1) pressing an imprint mold against the second recording layer to form the groove in the surface of the second recording layer, and (2) cutting a laminate including the first and second recording layers and the first and second intermediate layers into a predetermined shape, the steps (1) and (2) being performed simultaneously in one operation.

With this additional method steps, the number of operations in the manufacturing process can be reduced in comparison with an alternative configuration in which the thermal imprint process and cutting (stamping) are performed separately, so that the productivity of the multilayer optical information recording disk can be improved.

The above-described aspects and advantages, and other advantages and further features of the present invention will become more apparent by a detailed description of illustrative, non-limiting embodiments which will be given below with reference to the accompanying drawings.

BRIEF DESCRIPTION OF THE DRAWINGS

FIG. 4 includes diagrams (a)-(c) illustrating a first example of a method for manufacturing a disk;

FIG. 6 includes diagrams (a) and (b) illustrating the first example of the method for manufacturing a disk;

FIG. 8 includes diagrams (a)-(c) illustrating an example modified from the first example;

FIG. 11 includes (a) a plan view of a resin sheet after the thermal imprint process, and (b) a diagram illustrating registration marks on two recording layers of the resin sheet in which the registration marks on one of the two recording layers are not in alignment with those on the other of the two recording layers;

FIG. 12 includes diagrams (a) and (b) illustrating an example modified from the second example;

FIG. 13 includes (a) a diagram illustrating a cross-sectional structure of a multilayer optical information recording disk according to another embodiment, and (b) a diagram illustrating a method for forming a groove on both sides of one recording layer; and FIG. 14 includes (a) an AFM (atomic force microscope) image of grooves formed in a recording layer by a thermal imprint process, and (b) a diagram illustrating a profile of a cross section taken along the line A-B in the AFM image.

DESCRIPTION OF EMBODIMENT(S)

Figure 1:
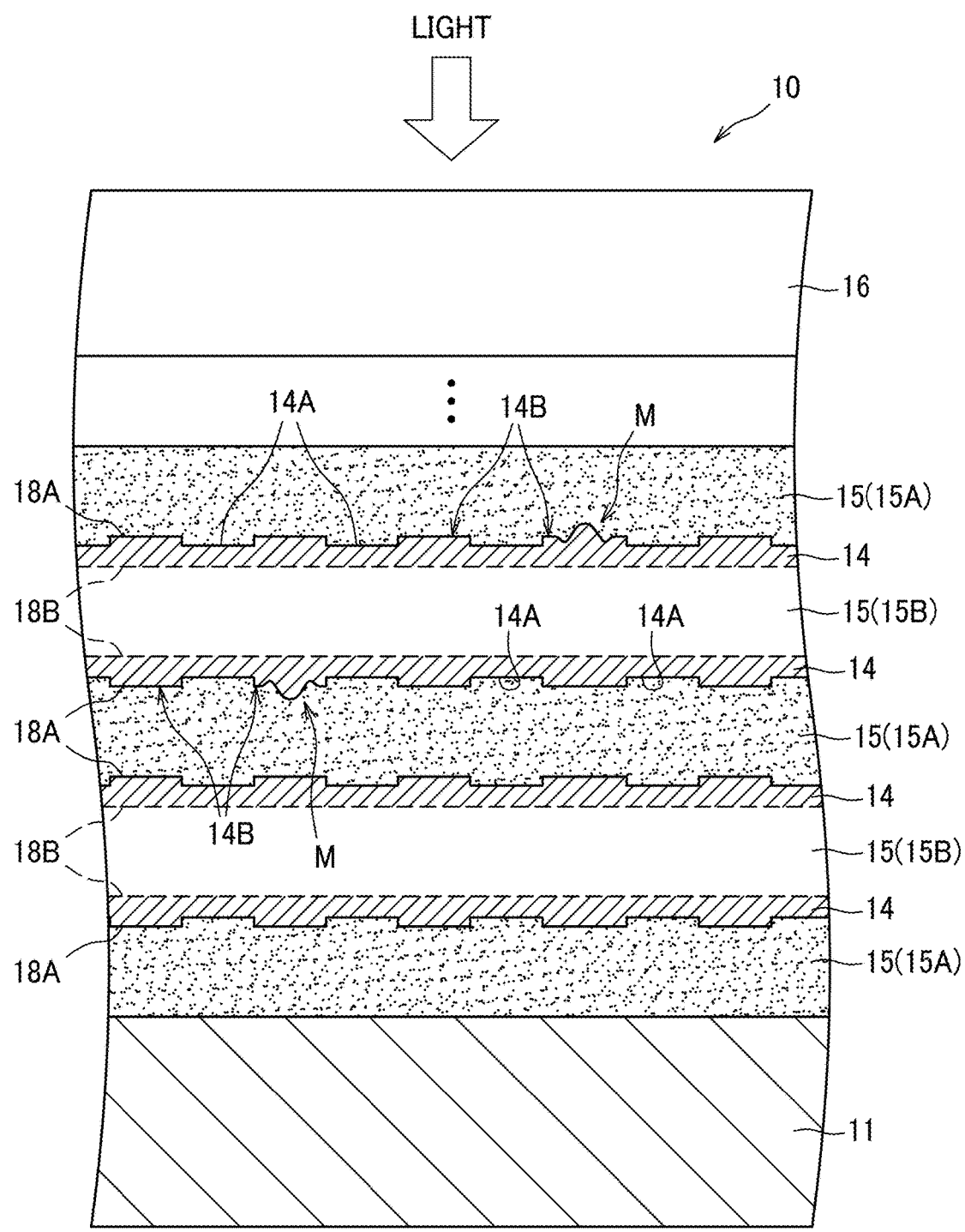
FIG. 1 is a cross-sectional view of a multilayer optical information recording disk according to one exemplary embodiment.

Next, one embodiment of the present invention will be described below with reference to the drawings.

It is to be understood that the drawing figures referred to in the following description are schematic diagrams for illustration purposes, and do not reflect their actual dimensions and the like.

<Structure of Multilayer Optical Information Recording Disk>

As shown in FIG. 1, a multilayer optical information recording disk 10 according to this embodiment comprises a substrate 11, a plurality of recording layers 14, a plurality of intermediate layers 15 (first intermediate layers 15A and second intermediate layers 15B), and a cover layer 16. In the following discussion, the interface formed between the recording layer 14 and the first intermediate layer 15A is referred to as a first interface 18A, and the interface formed between the recording layer 14 and the second intermediate layer 15B is referred to as a second intermediate layer 18B.

The substrate 11 is a supporting member for supporting the recording layers 14 and the intermediate layers 15 and the like, and made of a circular plate (disc-shaped member) of polycarbonate, for example. In the embodiments illustrated below, the material for the substrate 11 and its thickness may be selected without limitation.

Each recording layer 14 is a layer made of a photosensitive material in which information is optically recordable, and has a groove 14A having the shape of a spirally-shaped curve or curves, or concentric circles.

The groove 14A is a groove for track-following servo control under which the position of the focal point of the recording/reading beam is adjusted with reference to the groove 14A so that the recording/reading beam can be accurately applied to the tracks extending circumferentially on the recording layer 14. In this disclosure, the shape and the width, depth and pitch of the groove(s) may be selected appropriately according to the use or the like of the disk, without limitation as long as the groove can be utilized for track-following servo control and can be formed by a thermal imprint process as will be described later. One example of the groove 14A has a width of 160 nm, a depth of 60 nm, and a pitch of 320 nm.

In the present embodiment, the recording layer 14 includes a polymer binder and a dye dispersed in this polymer binder.

Examples of the polymer binder for use in the recording layer 14 may include, for example, polyvinyl acetate (PVAc), polymethylmethacrylate (PMMA), polyethylmethacrylate, polybutylmethacrylate, polybenzylmethacrylate, polyisobutylmethacrylate, polycyclohexylmethacrylate, polycarbonate (PC), polystyrene (PS), polyvinyl chloride (PVC), polyvinyl alcohol (PVA), polyvinyl benzoate, poly (vinyl pivalate), polyethylacrylate, polybutylacrylate, cychroolefin polymer, and the like.

On the other hand, examples of the dye for use in the recording layer 14 may include dyes (one-photon absorption dyes) which have been conventionally used as a heat mode type recording material. Further, in order to minimize adverse effects on adjacent recording layers 14 during recording/reading processes, the dyes may preferably contain a multiphoton absorption dye. As an example of the multiphoton absorption dye, a two-photon absorption dye having no linear absorption in the wavelength range of the reading beam is preferable.

Specifically, as examples of such a one-photon absorption dye, methine dyes (e.g., cyanine dyes, hemicyanine dyes, styryl dyes, oxonol dyes, and merocyanine dyes), macrocyclic dyes (e.g., phthalocyanine dyes, naphthalocyanine dyes, and porphyrin dyes), azo dyes (including azo-metal chelate dyes), arylidene dyes, complex dyes, coumarin dyes, azole derivatives, triazine derivatives, benzotriazole derivatives, benzophenone derivatives, phenoxazine derivatives, phenothiazine derivatives, 1-aminobutadiene derivatives, cinnamic acid derivatives, quinophthalone dyes, etc. may be used.

As examples of the two-photon absorption dye, any known compounds may be used without limitation as long as the two-photon absorption compound has no linear absorption in the wavelength range of the reading beam; for example, compounds having a structure represented by the following general formula (1) may be used.

[Chem. 1]

General Formula (1)

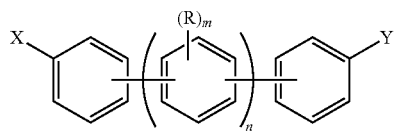

In the general formula (1), X and Y each represent a substituent having a Hammett's sigma-para value (σp value) of 0 or more, which may be the same as or different from each other; n represents an integer of 1 to 4; R represents a substituent, and a plurality of Rs may be the same as or different from one another; and m represents an integer of 0 to 4.

In the general formula (1), each of X and Y represents a group having a σp value taking a positive value in Hammett equation, i.e., what is called an electron-withdrawing group, which preferably includes, e.g., a trifluoromethyl group, a heterocyclic group, a halogen atom, a cyano group, a nitro group, an alkylsulfonyl group, an arylsulfonyl group, a sulfamoyl group, a carbamoyl group, an acyl group, an acyloxy group, an alkoxycarbonyl group and the like, more preferably a trifluoromethyl group, a cyano group, an acyl group, an acyloxy group, and an alkoxycarbonyl group, and most preferably a cyano group and a benzoyl group. Of these substituents, an alkylsulfonyl group, an arylsulfonyl group, a sulfamoyl group, a carbamoyl group, an acyl group, an acyloxy group and an alkoxycarbonyl group may further have a substituent for various purposes including giving solubility in a solvent. The examples of such substituents preferably include an alkyl group, an alkoxy group, an alkoxyalkyl group, an aryloxy group, etc.

n preferably is 2 or 3, and most preferably 2. If n is 5 or more, the greater n becomes, the more the linear absorption appears at the longer wavelength side, so that non-resonant two-photon absorption recording is not done with a recording beam at a wavelength range shorter than 700 nm.

R represents a substituent. The substituent is not specifically limited, and an alkyl group, an alkoxy group, an alkoxyalkyl group, and an aryloxy group are exemplified as specific examples.

The compound having the structure represented by the general formula (1) is not limited to specific examples; the compounds represented by the following chemical structural formulae D-1 to D-21 may be used.

[Chem. 2]

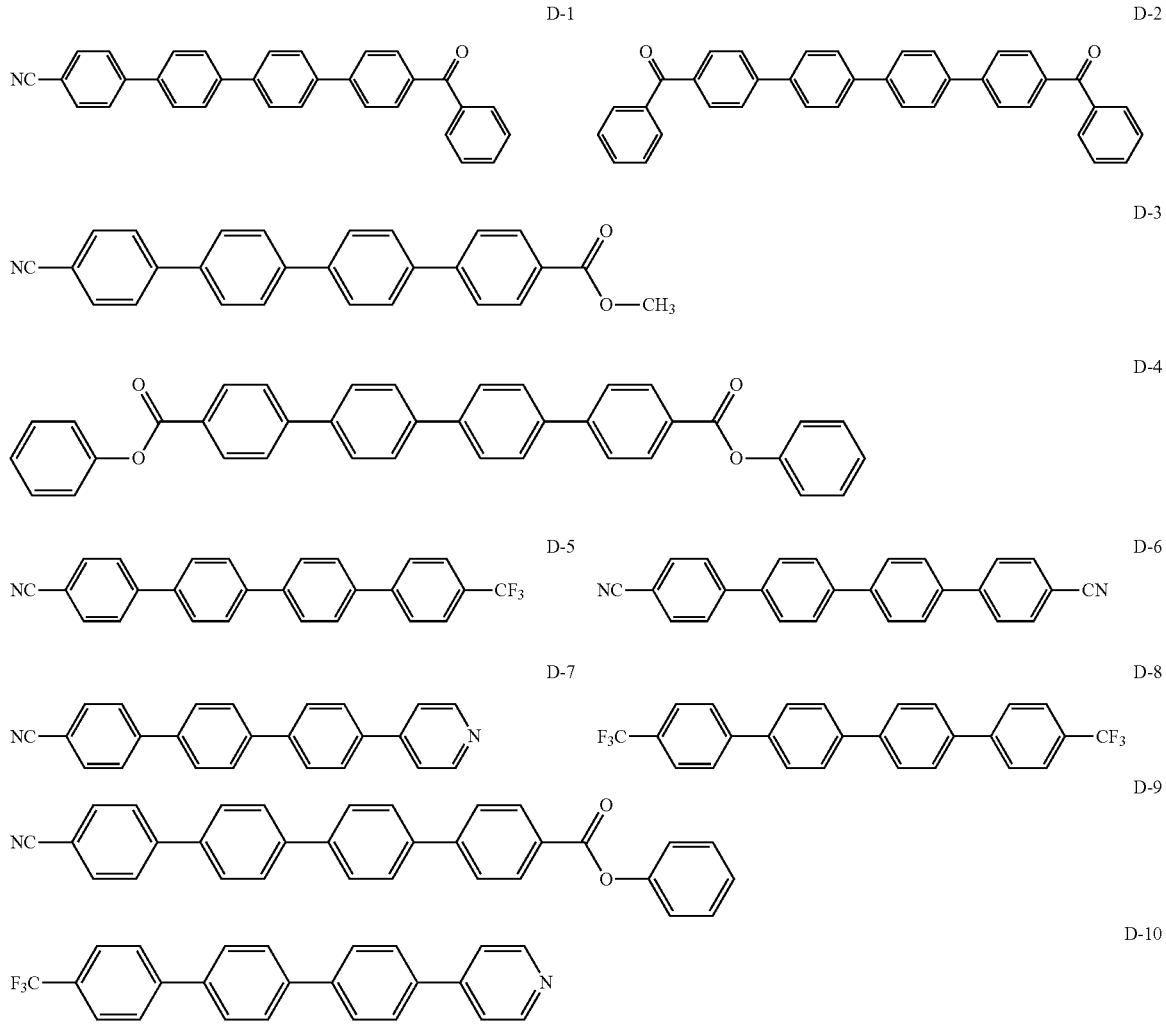

-continued
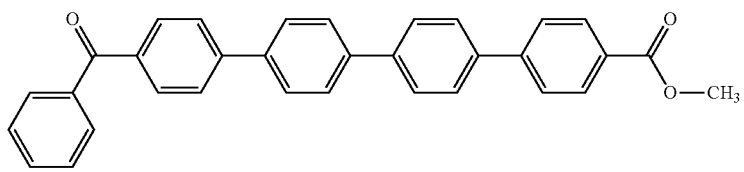
D-11
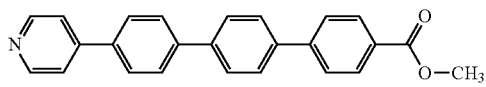
D-12
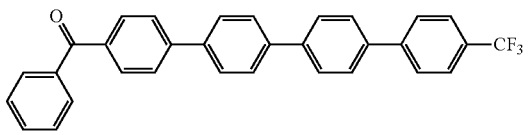
D-13
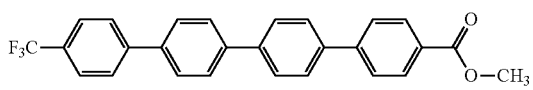
D-14
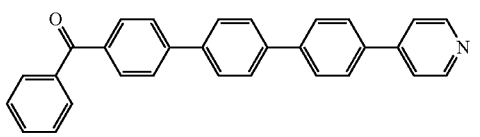
D-15
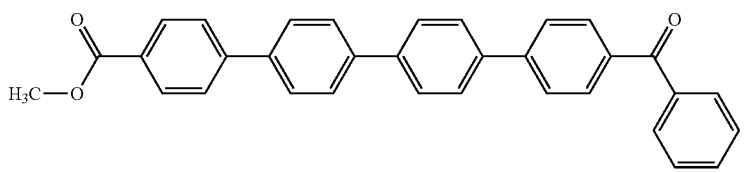
D-16
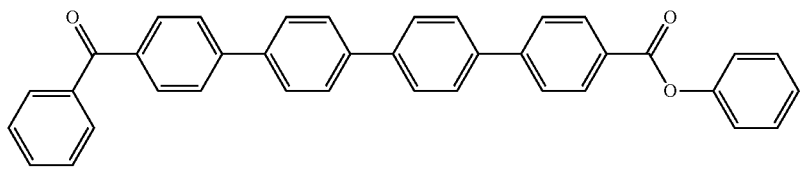
D-17
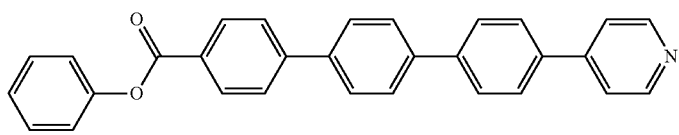
D-18
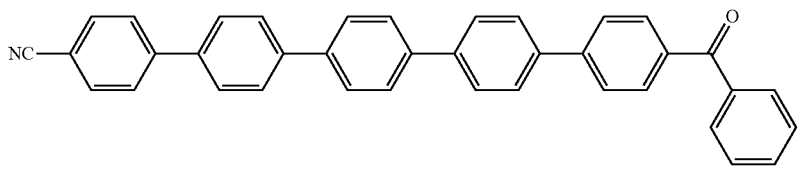
D-19
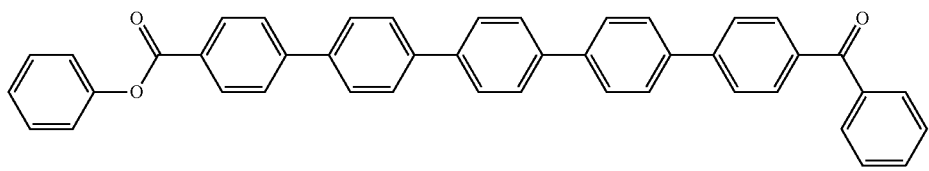
D-20
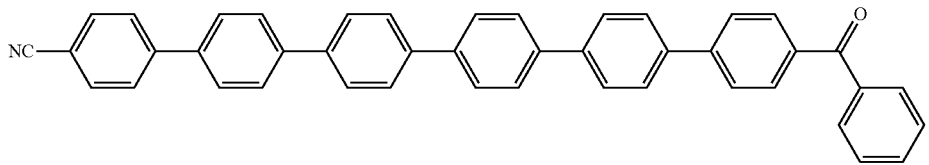
D-21

The dyes as mentioned above may be contained in the recording layer with a content of 1-80 percent by mass, more preferably 5-60 percent by mass, further preferably 10-40 percent by mass.

When the recording layer 14 is irradiated with a recording beam, the dye contained therein absorbs the recording beam and generates heat, which in turn deforms the polymer binder, causing the first interface 18A, to be more specific, at the land 14B between adjacent grooves 14A, 14A in the first interface 18A, to include a portion having a protrusive shape (recording mark M) protruding into the first intermediate layer 15A, thereby recording information at the first interface 18A. The recording mark M may be configured to also include a portion having a recessed shape recessed from the first intermediate layer 15A into the recording layer 14 (recessed with reference to the first interface 18A before deformation), around the portion having the protrusive shape protruding from the recording layer 14 into the first intermediate layer 15A.

To enable the above-described information recording scheme, the recording layer 14 is thicker than conventional recording layers containing a polymer binder and a dye; one recording layer 14 has a thickness in the range of 100 nm to 5 micrometers, preferably in the range of 100 nm to 3 micrometers, more preferably in the range of 200 nm to 2 micrometers. If the thickness is less than 50 nm, the interface between the recording layer and the intermediate layer so deforms as to include a portion recessed with reference to the recording layer, as in the conventional arts; however, as the thickness not less than 100 nm is provided herein, the interface so deforms as to include a portion having a protrusive shape provided at the center of a recorded spot. On the other hand, the upper limit of the thickness of the recording layer 14 is not limited in particular. It is however to be understood that the thickness of the recording layer 14 may preferably be not more than 5 micrometers in order to increase the number of recording layers 14 provided in one disk. In this embodiment, the thickness of the recording layer 14 is 400 nm (0.4 micrometers) by way of example.

A plurality of recording layers 14 are provided in one disk. For example, the number of the recording layers 14 may be approximately in the range of 2 to 100 layers. To increase the storage capacity of the multilayer optical information recording disk 10, the more the number of the recording layers 14, the better it may be; for example, it is preferable that ten or more layers are provided. Moreover, the material for the recording layer 14 may be selected so that the refractive index of the recording layer 14 may substantially not change before and after recording that causes the first interface 18A to deform.

The recording layer 14 may preferably have a recording beam absorption ratio (of one-photon absorption) equal to or less than 10% per one layer. Further, since the smaller absorption ratio is better to increase the number of recording layers 14, this absorption ratio of the recording layer 14 may be more preferably equal to or less than 8%, still more preferably equal to or less than 5%, and particularly preferably equal to or less than 3%. This is because, for example, if the intensity of the recording beam which reaches the deepest recording layer 14 has to be equal to or more than 50% of the intensity of the radiated recording beam, it is necessary that the absorption ratio per one recording layer is equal to or less than 8% in order to obtain eight-layered recording layers, and it is necessary that the absorption ratio per one recording layer is equal to or less than 3% in order to obtain twenty-layered recording layers. If the absorption ratio is high, the number of layers becomes small accordingly, and thus the effect of multilayering expected to result in increased storage capacity would be diminished.

The recording layer 14 as described above can be formed, as will be detailed later, by application using a spin coating method or a blade coating method, etc., and subsequent curing, of a liquid containing a dye material and a polymer binder dissolved in a solvent, to form a layer, which in turn is subjected to a thermal imprint process in which a mold having a reverse pattern of the groove 14A formed thereon is pressed against the layer. Herein, the mold for use in this imprint process is also referred to as a stamper or a template. Example of the solvent in which the dye material and the polymer binder may be dissolved for this purpose may include dichloromethane, chloroform, methyl ethyl ketone (MEK), acetone, methyl isobutyl ketone (MIBK), toluene, hexane, propylene glycol monomethyl ether acetate (PG-MEA), cyclohexanone, and the like.

The intermediate layers 15 are provided between the recording layers 14. In other words, the intermediate layer 15 is provided adjacent to the topside and underside of each recording layer 14. To be more specific, the intermediate layers 15 include a first intermediate layer 15A disposed adjacent to a first side of each recording layer 14 and a second intermediate layer 15B disposed adjacent to a second side of the recording layer 14, so that the first and second intermediate layers 15A and 15B are alternately arranged between the recording layers 14. In this embodiment, starting from the substrate 11 side, the first intermediate layer 15A, the recording layer 14, the second intermediate layer 15B, and the recording layer 14 are repeatedly arranged in this order.

In order to prevent interlayer crosstalk across a plurality of recording layers 14 (i.e., phenomenon in which a signal from one recording layer 14 is mixed with another signal from an adjacent recording layer 14), each intermediate layer 15 is provided to form a predetermined amount of space between the recording layers 14. For this purpose, the thickness of each intermediate layer 15 is, preferably, equal to or more than 2 micrometers, and more preferably, equal to or more than 5 micrometers. Each intermediate layer 15 may preferably be designed to be as thin as possible, that is, the thinner the thickness, the better it may be, as long as the interlayer crosstalk can be prevented to occur. For example, it is preferable that the thickness be equal to or less than 20 micrometers. In this embodiment, the thickness of each intermediate layer 15 is 10 micrometers by way of example. Since the first intermediate layer 15A and the second intermediate layer 15B both have the same thickness of 10 micrometers, the pitches of the first interface 18A vary, such as 10 micrometers, 10.8 micrometers, 10 micrometers, 10.8 micrometers, . . . . Such irregular pitches of the first interface 18A can lessen an undesirable influence, on the read-back beam, of interference between a read-back beam (a beam of light in which a read-back signal produced by application of a reading beam is embedded) reflected off a target first interface 18A from which information is currently being retrieved, and reflected light derived from reflection of the reading beam at the other first interfaces 18A adjacent to the target first interface 18A.

Each intermediate layer 15 is made of a material which is unreactive to irradiation with a laser beam applied during recording and reading operations. Further, in order to minimize the loss of the recording beam, the reading beam, and the read-back beam, it is preferable that the intermediate layer 15 is made of a material which is transparent to the recording beam, the reading beam, and the read-back beam.

Herein, the term "transparent" indicates that the absorption ratio thereof is equal to or less than 1%.

The first intermediate layer 15A is made of adhesive, and has an adhesive property with which it can be stuck to a surface of another object, and is softer than the recording layer 14. For example, the intermediate layer 15A has a glass transition temperature lower than the glass transition temperature of the recording layer 14. The use of the first intermediate layer 15A softer than the recording layer 14 as the intermediate layer adjacent to one side (first side) of the recording layer 14 makes this intermediate layer 15 likely to deform when the recording layer 14 is heated by application of the recording beam and expanded, so that deformation can be effected easily at the first interface 18A. Comparison of the hardness between the recording layer 14 and the intermediate layer 15 may be made by pressing bulk bodies of materials for the respective layers against each other. To be more specific, it can be confirmed that a bulk body having yielded to the counterpart bulk body to a relatively greater extent when they are pressed against each other is softer.

On the other hand, the second intermediate layer 15B is a layer harder than the first intermediate layer 15A. This second intermediate layer 15B is made of ultraviolet curable resin, polycarbonate, or the like. In the present embodiment, the second intermediate layer 15B is as hard as the recording layer 14, or harder than the recording layer 14. For example, the second intermediate layer 15B has a glass transition temperature equal to or higher than the glass transition temperature of the recording layer 14. The use of the second intermediate layer 15B as hard as or harder than the recording layer 14 as the intermediate layer 15 adjacent to the other side (second side) of the recording layer 14 makes this intermediate layer 15 unlikely to be caused to deform by application of the recording beam, so that the second interface 18B is not caused to include a portion having a protrusive shape; accordingly, the portion having a protrusive shape (recording mark M) is formed only at the first interface 18A.

In the present embodiment, the refractive indices of the first intermediate layer 15A and the second intermediate layer 15B are different from each other, while the refractive indices of the recording layer 14 and the second intermediate layer 15B are substantially the same. To be more specific, the recording layer 14 and the second intermediate layer 15B may preferably have comparable refractive indices such that the following inequality is satisfied:

$$((n3-n1)/(n3+n1))^2 \leq 0.0003$$

where n1 represents the refractive index of the recording layer 14, and n3 represents the refractive index of the second intermediate layer 15B; that is, the reflectivity at the second interface 18B may preferably be equal to or less than 0.0003 (0.03%).

It is preferable that the refractive indices of the recording layer 14 and the second intermediate layer 15B approximate as closely as possible to each other in order to minimize reflection at the second interface 18B, and the difference may be preferably equal to or less than 0.05, more preferably equal to or less than 0.03, further preferably equal to or less than 0.01, and most preferably equal to zero. As one example, the refractive index n1 of the recording layer 14 is 1.565, and the refractive index n3 of the second intermediate layer 15B is 1.564. In this instance, the reflectivity $((n3-n1)/(n3+n1))^2$ is substantially equal to (closely approximates) zero.

On the other hand, the refractive indices of the recording layer 14 and the first intermediate layer 15A are different from each other, and these refractive indices may preferably be configured to differ moderately from each other. This enables reflection of the reading beam by the steep change in refractive index at the first interface 18A. To be more specific, the difference between the refractive indices of the recording layer 14 and the first intermediate layer 15A may preferably be greater than the difference between the refractive indices of the recording layer 14 and the second intermediate layer 15B, and equal to or less than 0.11. Specifically, the refractive indices of the recording layer 14 and the first intermediate layer 15A may preferably be different from each other to such an extent that the following inequality is satisfied:

$$0.0005 \leq ((n2-n1)/(n2+n1))^2 \leq 0.04$$

where n1 represents the refractive index of the recording layer 14, and n2 represents the refractive index of the first intermediate layer 15A; that is, the reflectivity at the first interface 18A may preferably be not smaller than 0.0005 (0.05%) and not greater than 0.04 (4%).

Since the reflectivity is not smaller than 0.0005, the quantity of light reflected at the first interface 18A is large, so that a high signal-to-noise ratio is achieved in the process of reading information. On the other hand, since the reflectivity is not greater than 0.04, the quantity of light reflected at the first interface 18A is restricted to a moderate magnitude, so that the recording/read-back beam can reach deeper recording layers 14 without undergoing considerable attenuation in the recording and reading processes. This makes it possible to increase the storage capacity by providing a large number of recording layers 14. As one example, the refractive index n1 of the recording layer 14 is 1.565, and the refractive index n2 of the first intermediate layer 15A is 1.477. In this instance, the reflectivity $((n2-n1)/(n2+n1))^2$ at the first interface 18A is 0.0008 (0.08%).

By adjusting the refractive indices of the recording layers 14 and the respective intermediate layers 15 as described above, the total light transmittance of the first interface 18A and the second interface 18B can be made higher, so that when the number of recording layers 14 is increased, the beam is allowed to reach deeper recording layers that are the layers farther from a source of the recording/reading beam. This is advantageous in an attempt to increase the storage capacity by multilayering (increasing the number of recording layers). In particular, this embodiment proposes to provide the recording layers 14 and the second intermediate layers 15B having substantially the same refractive index, which makes the light reflectivity at the second interface 18B substantially equal to zero, thus allowing the beam to reach deeper recording layers 14; this would also be advantageous in increasing the storage capacity by increasing the number of recording layers.

In order to adjust the refractive indices of the recording layer 14 and the intermediate layer 15, the composition of the materials for use in the recording layer 14 and for use in the intermediate layer 15 may be adjusted.

To be more specific, since the material for the recording layer 14 contains polymer binder and a dye, the refractive indices of the polymer binder and the dye can be adjusted as desired by appropriately selecting the dye or the polymer binder having an appropriate refractive index and changing their respective composition ratios. The refractive index of the polymer binder varies depending on the degree of polymerization even if they have similar basic constitution. Therefore, the refractive index thereof can also be adjusted by using polymer binders with different degrees of polymerization or by adjusting the degree of polymerization of the polymer binder. Further, adjustment can be made by mixing different kinds of polymer binders. Further, a refractive index matching material (inorganic particulate and the like) may be added to adjust the refractive index.

To adjust the refractive index of the intermediate layer 15, the degree of polymerization of the polymer material such as a resin usable as the material for the intermediate layer 15 may be adjusted. As an alternative, a material usable for the intermediate layer 15 may be optionally added to adjust the refractive index, or the adjustment can also be made by adding a refractive index matching material (inorganic particulate and the like).

The cover layer 16 is a layer provided to protect the recording layers 14 and the intermediate layers 15, and is made of a material which allows the recording/reading/read-back beam to pass through the cover layer 16. The cover layer 16 has an appropriate thickness in the range from several tens micrometers to several millimeters.

A method for recording and reading information in the multilayer optical information recording disk 10 as described above will be described hereafter.

Figure 2:
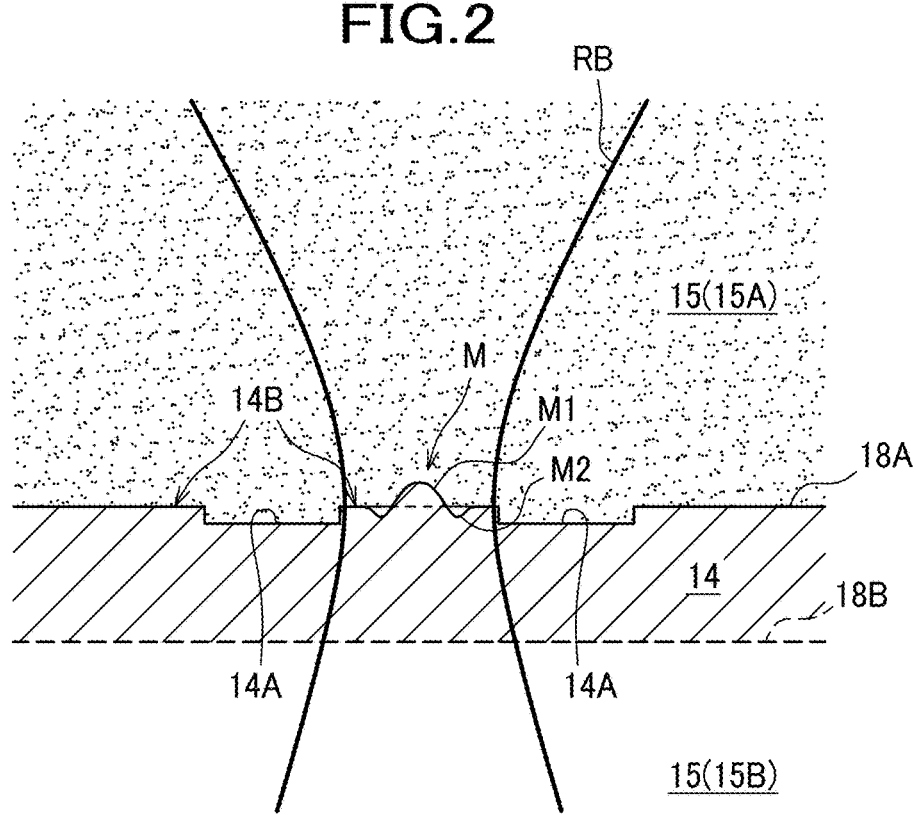
FIG. 2 is a diagram illustrating recording of information in the disk and a recording mark formed by the recording of information.

To record information in a desired recording layer 14, as seen in FIG. 2, the recording layer 14 is irradiated with a laser beam (recording beam RB) the output of which is modulated in accordance with the information to be recorded. As one example, the wavelength of the laser beam is 405 nm. If the recording layer 14 contains a multiphoton absorption compound as a recording dye, it is preferable that the laser beam used for this recording may be a pulsed laser beam, the peak power of which can be increased. The focal position of the recording beam RB may be set to a position, but not limited thereto, for example, near the first interface 18A, preferably a position shifted from the first interface 18A to the recording layer 14 side.

When a recording beam RB is applied, a center of an area on which the recording beam RB is applied takes a protrusive shape protruding from the recording layer 14 into the first intermediate layer 15A and forms a recording mark M (pit). More specifically, the recording mark M shown in FIG. 2 includes a center portion which forms a protrusion M1, and an annular recessed portion M2 which surrounds the protrusion M1 and is recessed into the recording layer 14. The distance from the first interface 18A (the first interface 18A before undergoing a change in shape) to the deepest portion of the recessed portion M2 is smaller than the distance from the first interface 18A (the first interface 18A before undergoing a change in shape) to the peak of the protrusion M1. In other words, the recording mark M can be considered to assume a generally protrusive shape as a whole. It is to be understood that the recording mark may be configured to include only a protrusion M1 with no recessed portion M2 formed therearound depending upon the recording conditions as the case may be.

Figure 3:
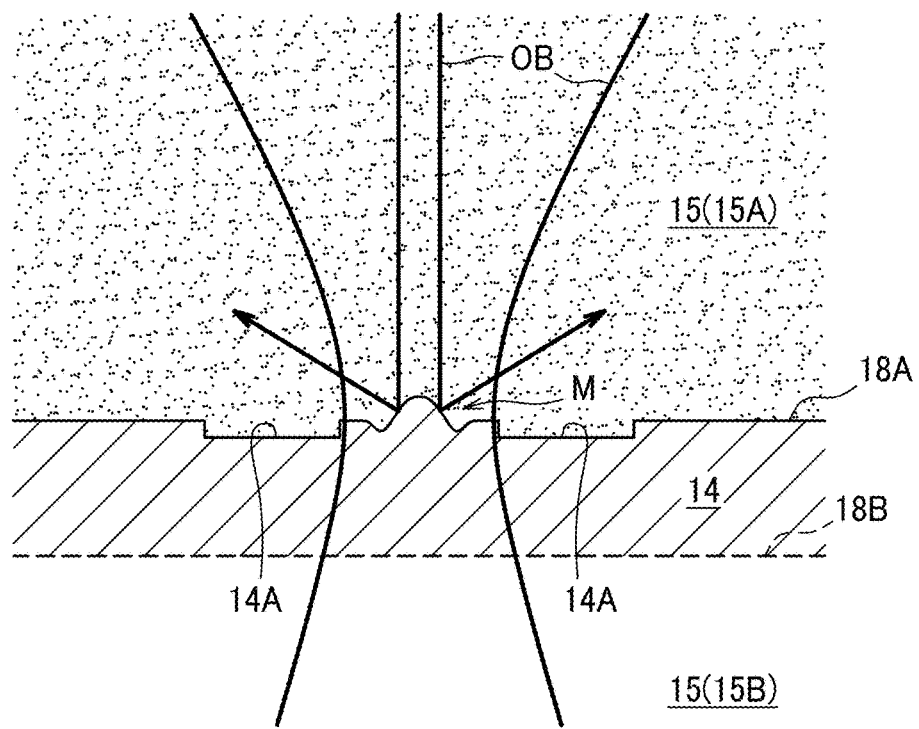
FIG. 3 is a diagram illustrating retrieval (reading) of information recorded in the disk.

As shown in FIG. 3, when the recording mark M is irradiated with the reading beam OB produced by the continuous-wave laser, the reading beam OB is reflected at the first interface 18A because of a difference in refractive index between the recording layer 14 and the first intermediate layer 15A. In this reflected beam at the first interface 18A, a difference in light intensity between the light reflected off a portion surrounding the recording mark M and the light reflected off the recording mark M can be observed, which makes the recording mark M detectable. As the refractive index of the recording layer 14 has not changed, the reflection of the reading beam OB would not occur in the recording layer 14 but occur only at the first interface 18A, so that stable detection of the recording mark M can be achieved. To enable such optical detection, it is considered to be preferable that the protrusion M1 protrudes beyond a position of the interface 18 (first interface 18A) before undergoing a change in shape to such an extent that ranges from 1 to 300 nm or so.

In this embodiment, the recording mark M has a recessed portion M2 formed around the protrusion M1, and thus distribution of the intensity of light reflected off a recording mark M when a reading beam OB for detecting a recording mark M is applied to the recording mark M is expected to change steeply according to the distance from the center of the protrusion M1, more steeply than the configuration in which only the protrusion M1 is present, with the result that a read-back signal with a higher degree of modulation can be obtained.

In the multilayer optical information recording disk 10 according to the present embodiment, the groove 14A for track-following servo control is formed in each recording layer 14, and thus the track-following servo control and the recording/reading operation for the recording layer 14 can be performed by a single laser beam (recording/reading beam). This makes it possible to use an optical system similar to the recording/reading apparatus for a conventional optical information recording disk, for the purpose of recording or retrieving information into or from the multilayer optical information recording disk 10. Moreover, the groove 14A for track-following servo control provided for each recording layer 14 enables accurate tracing of the tracks in the recording layers 14. Accordingly, in cases for example after recording is performed halfway at a specific position in one recording layer 14, subsequent recording from that specific position in the recording layer 14 can be performed without difficulty.

<Method for Manufacturing a Multilayer Optical Information Recording Disk>

Next, an exemplary method for manufacturing a multilayer optical information recording disk 10 according to the present embodiment will be described below, by illustrating two specific examples.

First Example of the Method

In the first example, as shown in FIG. 4(*a*), first, a second intermediate layer 15B is formed on a surface of a first release sheet 21 to which a releasing agent is applied. To be more specific, the second intermediate layer 15B may be formed, for example, by applying an ultraviolet curable resin material to the first release sheet 21 and applying ultraviolet radiation thereto to thereby cure the resin material. The releasing agent applied to the first release sheet 21 in the present embodiment has a higher-grade releasing property such that a force required for peeling off the first release sheet 21 is weaker than a force required for peeling off a second release sheet 22 that will be described later. In the present embodiment, the application method for forming the respective layers may be selected without limitation; for example, spin coating, knife coating, roll coating, bar coating, blade coating, die coating, gravure coating and any other coating methods may be adopted.

Next, a recording layer 14 (first recording layer) is formed on the second intermediate layer 15B. To be more specific, the recording layer 14 may be formed by applying a liquid containing a polymer binder and a dye dissolved in a solvent, to the second intermediate layer 15B, and drying the same until it cures.

Next, a groove 14A is formed in the surface of the recording layer 14 by a thermal imprint process to obtain a first sheet S1. To be more specific, in this step, first, as shown in FIG. 4(b), a mold 31 for the thermal imprint process (hereinafter also referred to as "imprint mold", or "mold") preheated at a predetermined temperature is pressed against the surface of the recording layer 14 at a predetermined pressure. Subsequently, the recording layer 14 is cooled, and the mold 31 is released from the recording layer 14, with the result that the first sheet S1 with the groove 14A formed in the surface of the recording layer 14 can be obtained as shown in FIG. 4(c).

The mold 31 has a protrusively formed reverse pattern of the groove 14A to be formed in the surface of the recording layer 14. In the present embodiment, the method for fabricating a mold may be selected without limitation; for example, a method of electroforming with a nickel or other metal material, and a method including application of a resist on a nickel, quartz, silicon or other material, followed by an imprint process and subsequent etching to form projections and depressions can be adopted.

The thermal imprint process for the recording layer 14 may preferably include heating the mold 31 up to a temperature range of Tg±25° C. where Tg is a glass transition temperature of the recording layer 14 in degrees Celsius. The thermal imprint process for the recording layer 14 may preferably include pressing the mold 31 against the recording layer 14 at a pressure not lower than 0.1 MPa, and more preferably at a pressure not lower than 1 MPa.

Figure 5:
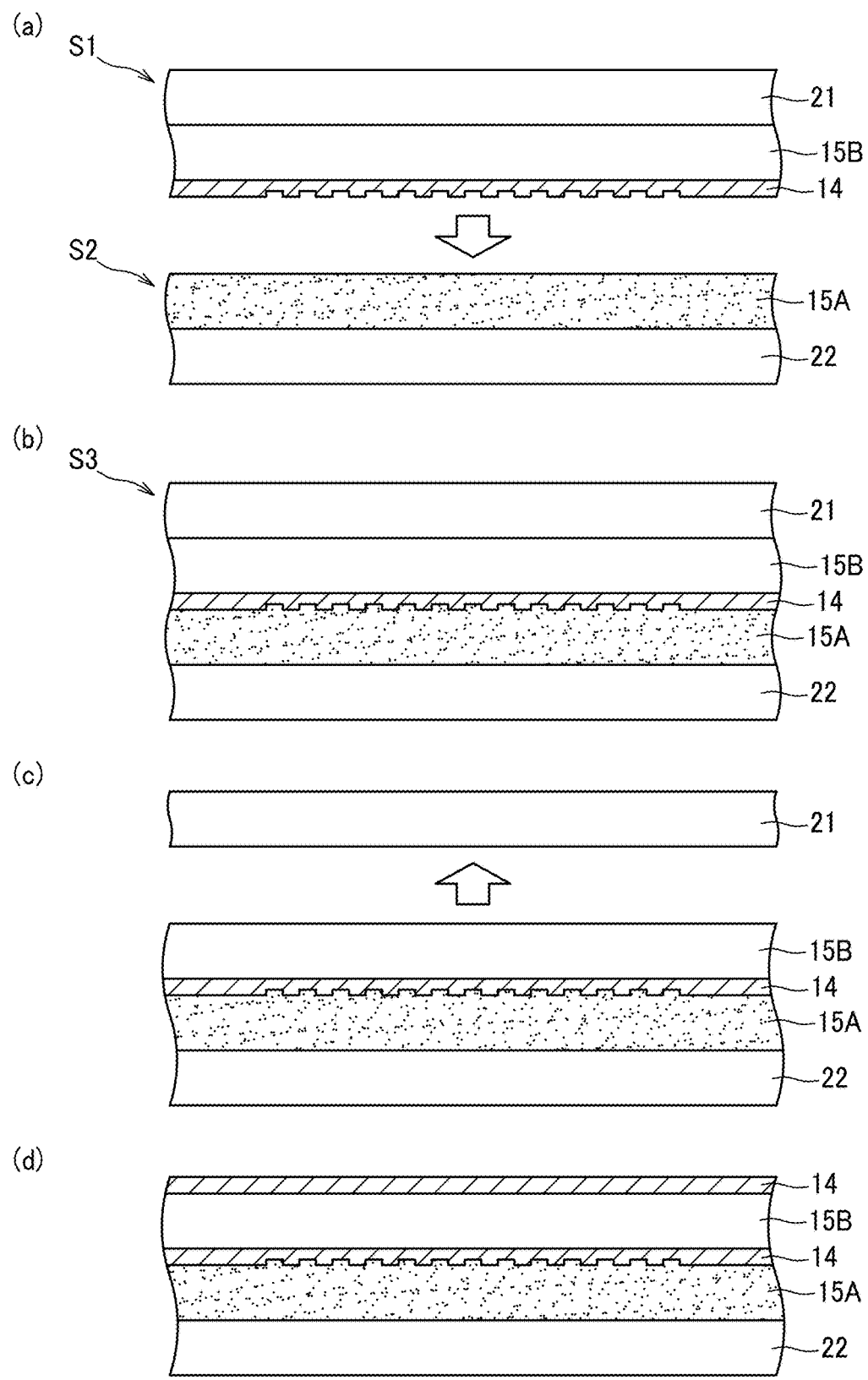
FIG. 5 includes diagrams (a)-(d) illustrating the first example of the method for manufacturing a disk.

Next, as shown in FIG. 5(a), a first intermediate layer 15A is formed on a surface of a second release sheet 22 to which a releasing agent is applied (the second release sheet 22 is prepared separately from the first release sheet 21), to obtain a second sheet S2. To be more specific, the first intermediate layer 15A may be formed by applying an adhesive to the second release sheet 22. It is to be understood that the step of making the first sheet S1 and the step of making the second sheet S2 may be performed in any order without limitation.

Next, the recording layer 14 (first recording layer) of the first sheet S1 and the first intermediate layer 15A of the second sheet S2 are laminated, thereby forming a laminate consisting of the first sheet S1 and the second sheet S2 (i.e., the first intermediate layer 15A is formed on the surface of the recording layer 14 in which the groove 14A is formed) to obtain a third sheet S3 as shown in FIG. 5(b).

Next, as shown in FIG. 5(c), the first release sheet 21 is removed from the third sheet S3 to expose the second intermediate layer 15B. Since the first release sheet 21 is more easily releasable than the second release sheet 22 as mentioned above, only the first release sheet 21 can be removed easily while keeping the second release sheet 22 from being removed. Then, as shown in FIG. 5(d), a new recording layer 14 (second recording layer) is formed on an exposed surface of the second intermediate layer 15B.

Next, as shown in FIG. 6 (a), (b), a groove 14A is formed in a surface of the newly-formed recording layer 14 (second recording layer of which the surface is exposed) by the thermal imprint process to obtain a fourth sheet S4 that is a multilayer sheet. A specific method of the thermal imprint process performed in this step is substantially the same as that performed in the step for obtaining the first sheet S1 described above; it is however to be noted that when the mold 31 is pressed against the recording layer 14, the position of the mold 31 is adjusted precisely, so that the position of the groove 14A to be formed in this step in the second recording layer 14 is aligned with the groove 14A formed in the previous step in the first recording layer 14 for obtaining the first sheet S1, preferably with the precision (tolerance) of 25 micrometers in radial directions.

The fourth sheet S4 obtained as described above is rolled up into a roll which is put into a storage, and only a necessary length of which is dispensed therefrom when used.

Figure 7:
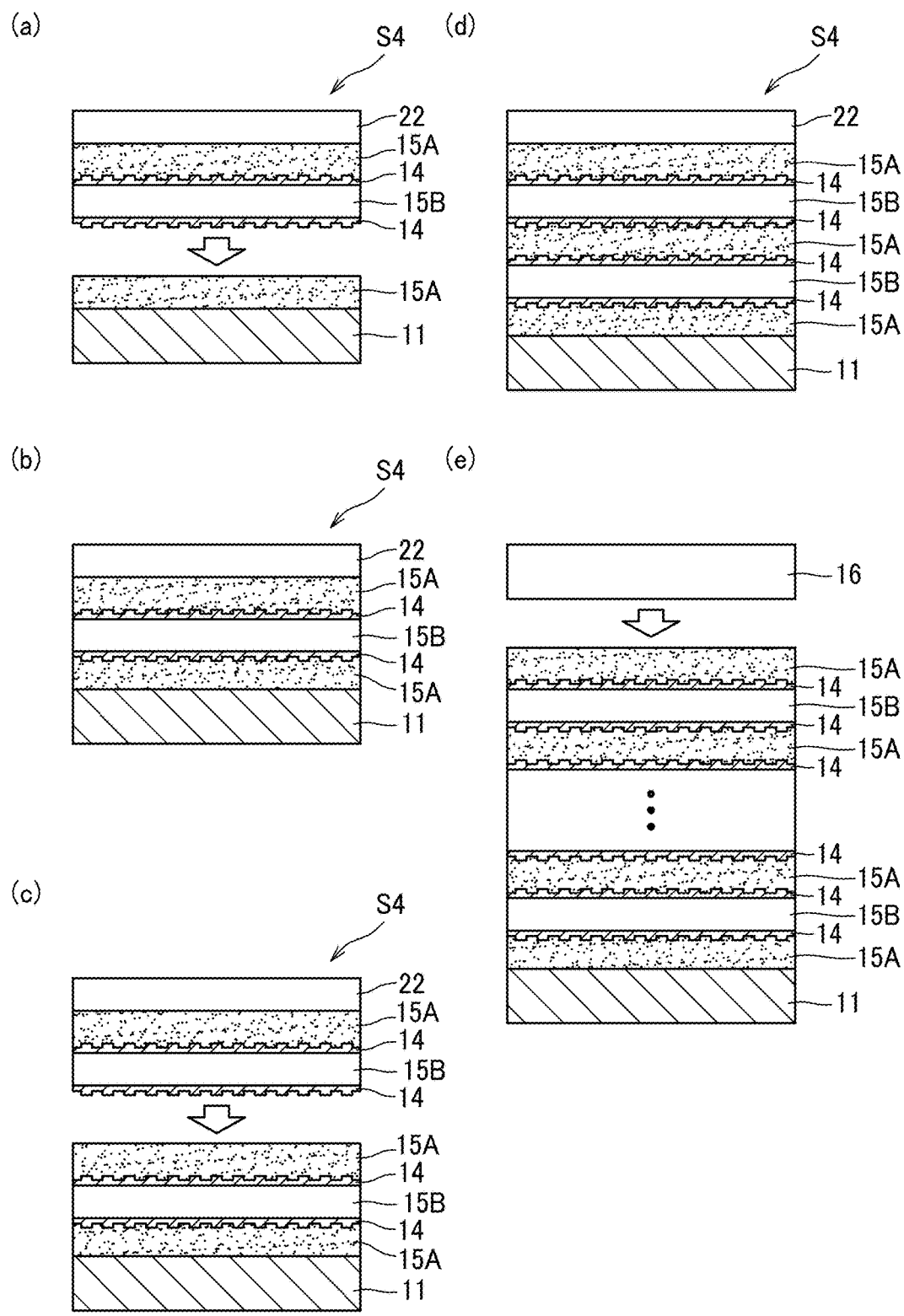
FIG. 7 includes diagrams (a)-(e) illustrating the first example of the method for manufacturing a disk.

Next, as shown in FIG. 7(a), a substrate 11 is prepared, and a first intermediate layer 15A (adhesive layer) is formed on the substrate 11. On the other hand, the fourth sheet S4 rolled up in a roll is dispensed, and stamped into the shape of the substrate 11. Then the exposed recording layer 14 (second recording layer) of the stamped fourth sheet S4 is laminated on the first intermediate layer 15A formed on the substrate 11, to form a laminate of the first intermediate layer 15A, the second recording layer 14, the second intermediate layer 15B, the first recording layer 14 and the first intermediate layer 15A arranged in this order from below over the substrate 11, as shown in FIG. 7(b).

Next, as shown in FIG. 7(c), the second release sheet 22 is removed from the fourth sheet S4 laminated on the substrate 11, to expose the first intermediate layer 15A, and an exposed second recording layer 14 of another stamped fourth sheet S4 is laminated on the exposed surface of the first intermediate layer 15A, to provide a laminate of two unit structures (fourth sheets S4) consisting of the first recording layer 14, the second intermediate layer 15B, the second recording layer 14 and the first intermediate layer 15A over the substrate 11, as shown in FIG. 7(d).

The alignment (registration) to be made when the fourth sheet S4 is laminated on the substrate 11 and when one fourth sheet S4 is laminated on another fourth sheet S4 can be achieved by aligning the hole formed in the center of the substrate 11 with the hole formed in the center of the fourth sheet S4 when the fourth sheet S4 is stamped. When one fourth sheet S4 is laminated on another fourth sheet S4, the positions of the grooves 14A in the two fourth sheets S4 may preferably be aligned with a precision (tolerance) of 25 micrometers in the radial directions.

Afterwards, the steps of removing the second release sheet 22 from the uppermost fourth sheet S4 of one or more of the fourth sheets S4 stacked over the substrate 11 to expose the first intermediate layer 15A, and laminating thereon the exposed recording layer 14 (second recording layer) of another stamped fourth sheet S4 are repeated once or more times as required.

Lastly, as shown in FIG. 7(e), the second release sheet 22 is removed from the uppermost fourth sheet S4 of one or more of the fourth sheets S4 stacked over the substrate 11 to expose the first intermediate layer 15A, and a cover layer 16 is laminated thereon. In this way, a multilayer optical information recording disk including a plurality of recording layers 14 as shown in FIG. 1 can be manufactured.

Although the above-described first example of the method includes a stamping step which is performed when the fourth sheet S4 is used and in which the fourth sheet S4 is stamped into the shape of the substrate 11 (disc-like shape), the present invention is not limited to this process. For example, as shown in FIG. 8(a)-(c), the mold 32 for use in the step carried out to obtain the fourth sheet S2 may be configured to include a stamping blade 32B, for example, having a cylindrical shape, so that in the step for obtaining the fourth sheet S2, formation of the groove 14A and cutting (stamping) of the recording layers 14 and the intermediate layers 15 into a disc-like shape may be performed at the same time by a single step of pressing the mold 32 against the recording layer 14. With this configuration, the number of operations in the manufacturing process can be reduced in comparison with an alternative configuration in which the thermal imprint process and cutting (stamping) are performed separately, so that the productivity of the multilayer optical information recording disk 10 can be improved.

Second Example of the Method

Figure 9:
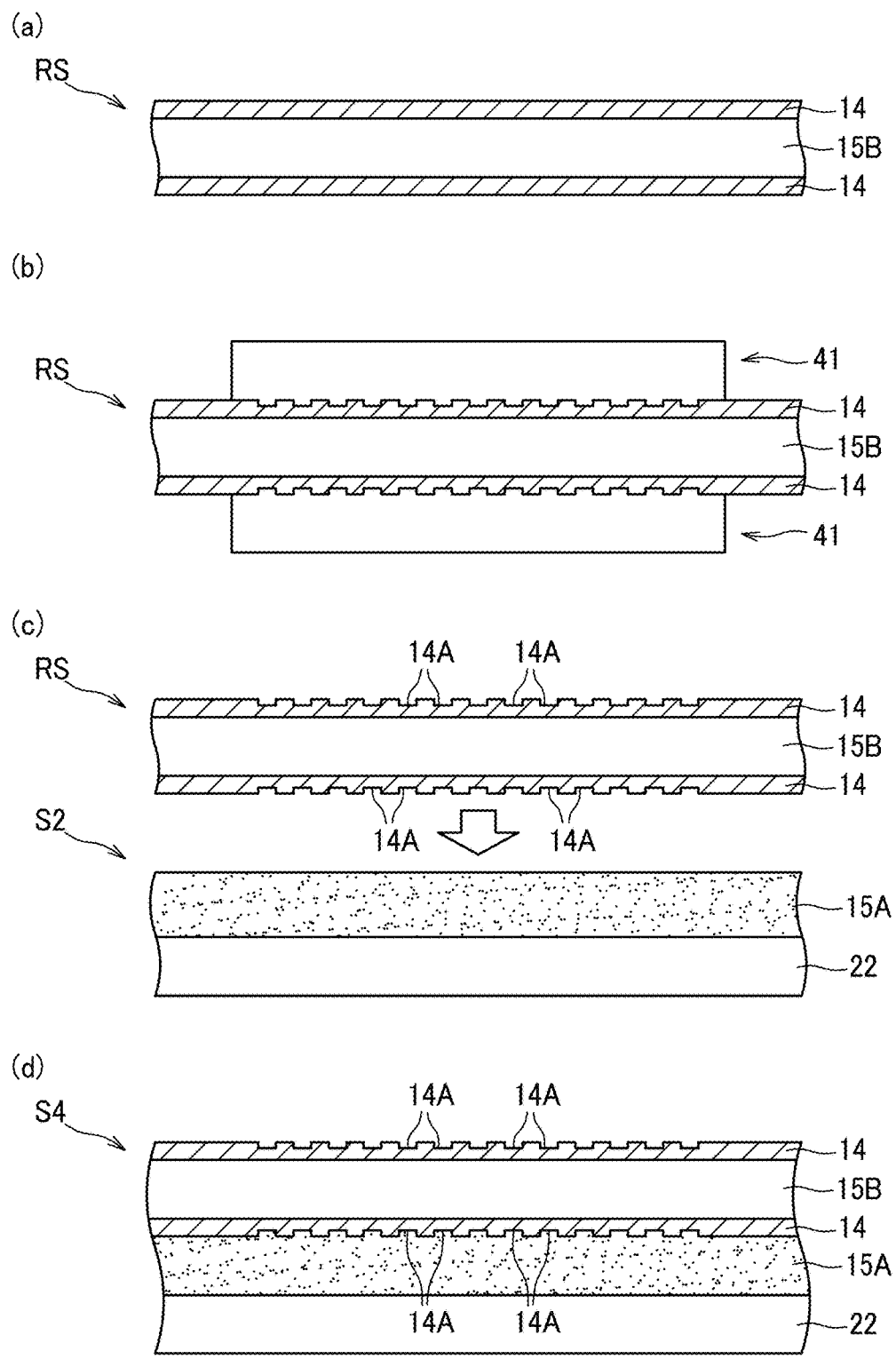
FIG. 9 includes diagrams (a)-(d) illustrating a second example of the method for manufacturing a disk.

In the second example, as shown in FIG. 9(*a*), recording layers 14 are formed on the both sides of the second intermediate layer 15B (e.g., polycarbonate shaped into a sheet), respectively, to obtain a resin sheet RS. The recording layers 14 may be formed on the both sides simultaneously or separately one by one.

Next, as shown in FIG. 9(*b*), the grooves 14A are formed simultaneously on the surfaces of the respective recording layers 14 of the resin sheet RS by the thermal imprint process.

Figure 10:
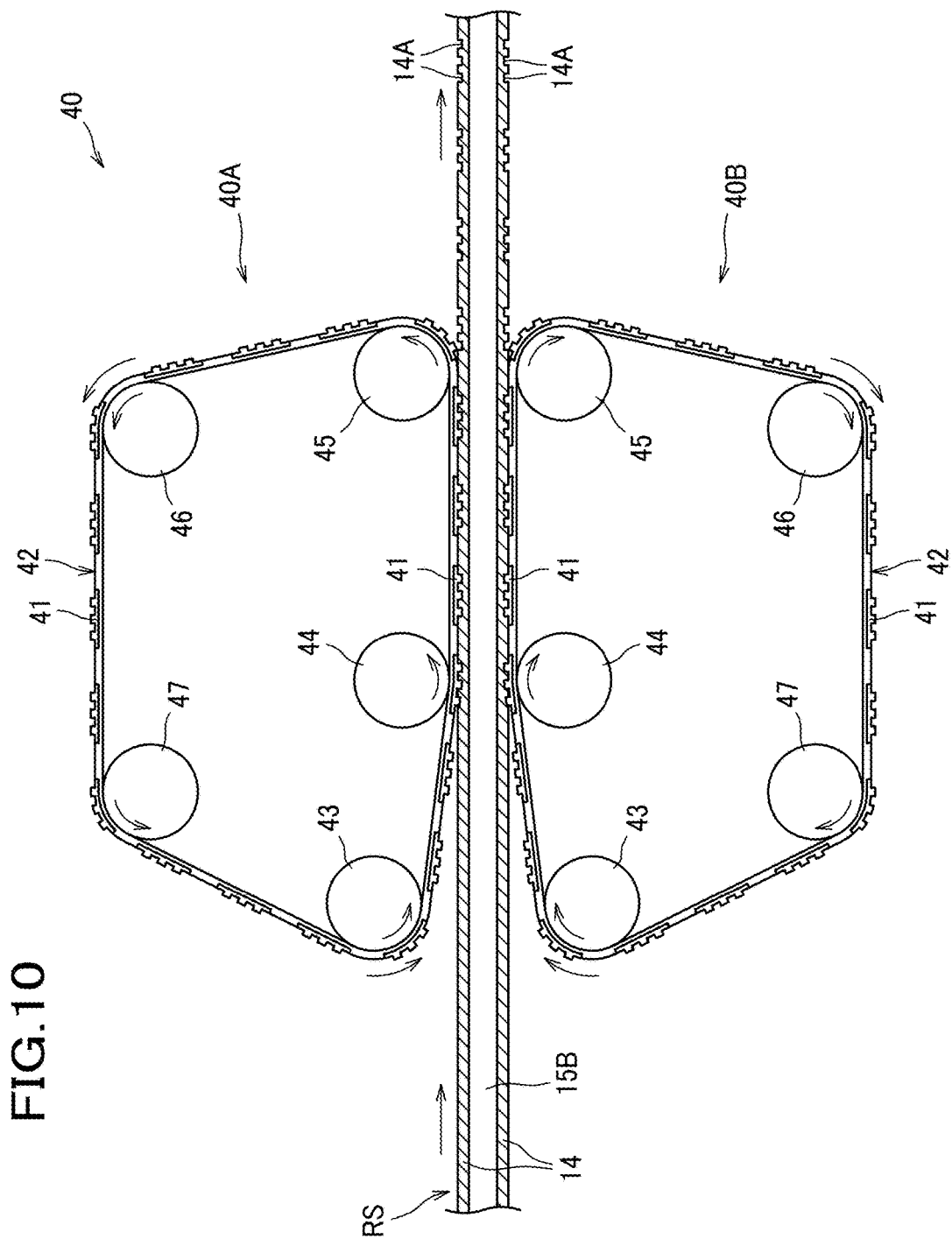
FIG. 10 is a diagram illustrating a thermal imprint device used in a thermal imprint process in the second example of the method for manufacturing a disk.

Hereafter, one example of a thermal imprint device for use in this step (thermal imprint process) will be described briefly. As shown in FIG. 10, the thermal imprint device 40 includes a pair of transfer mechanisms 40A, 40B of which one is disposed above and the other is disposed below, adjacently to each other, as illustrated herein. Each transfer mechanism 40A, 40B is configured to mainly include an endless belt 42 on which a plurality of molds 41 are provided, and a plurality of rollers 43-47 around which the endless belt 42 is looped. This thermal imprint device 40 is configured such that when the resin sheet RS conveyed from left to right in FIG. 10 passes through between the pair of rotating endless belts 42 of the transfer mechanisms 40A, 40B, the protrusion patterns of the molds 41 are transferred to the surfaces of the respective recording layers 14, forming the grooves 14A therein, concurrently. In this process, the molds 41 are heated to a predetermined temperature before getting held between the pair of pressing rollers 44, and pressed against the resin sheet RS (recording layers 14) between the pair of pressing rollers 44 at a predetermined pressure. Thereafter, while the molds 41 kept in contact with the recording layers 14 are being conveyed from the pair of pressing rollers 44 toward the release rollers 45, the molds 41 are cooled and then released from the recording layers 14 by the release rollers 45.

As shown in FIG. 11(*a*), in this embodiment, when the thermal imprint process is performed, registration marks 14M are formed simultaneously with the formation of the grooves 14A (groove formation area 14G). The registration marks 14M are formed in two positions opposite to each other at the both edges of the resin sheet RS across the center C of the groove formation area 14G (corresponding to the center of the multilayer optical information recording disk 10); thus, the center C of the groove formation area 14G is to be located at the midpoint of a segment connecting two corresponding registration marks 14M arranged at the opposite sides. Each registration mark 14M is a pattern transferred through the thermal imprint process from each mold 41 (see FIG. 10) in which a protrusion pattern (not shown) reverse to the pattern of the registration mark 14M is formed. The registration marks 14M are formed on both sides of the resin sheet RS (both recording layers 14), respectively. The thermal imprint process in this example includes an initially performed tentative thermal imprint operation on the resin sheet RS. If misregistration between the registration marks 14M on one side (see solid lines) and the registration marks 14M on the other side (see broken lines) occurs as shown in FIG. 11(*b*) beyond a predetermined tolerance, the positions of the endless belts 42 and/or the molds 41 of the thermal imprint device 40 shown in FIG. 10 are adjusted to align the positions of the registration marks 14M on the two sides (the positions of the grooves 14A on the two sides) with each other. After the positions of the registration marks 14M on the two sides are neatly aligned within the predetermined tolerance, the thermal imprint operation is performed on a resin sheet RS for final products. The positions of the grooves 14A on one side and the positions of the grooves 14A on the other side may be adjusted preferably with a tolerance (precision) of 25 micrometers in radial directions, more preferably with a tolerance (precision) of 10 micrometers in the radial directions.

Next, as shown in FIG. 9(*c*), a first intermediate layer 15A is formed on a release sheet 22 to obtain a second sheet S2 (fifth sheet). It is understood that the second sheet S2 may be made and prepared beforehand.

Next, the first intermediate layer 15A of the second sheet S2 is laminated on one of the recording layers 14 (first recording layer 14) in which the groove 14A is formed, thereby forming a laminate of the resin sheet RS and the second sheet S2, so that the first intermediate layer 15A is formed on the surface (with the groove 14A formed therein) of the first recording layer 14 as shown in FIG. 9(*d*), to obtain a fourth sheet S4 (sixth sheet) as a multilayer sheet.

The fourth sheet S4 obtained as described above is rolled up into a roll which is put into a storage, and only a necessary length of which is dispensed therefrom when used.

Thereafter, process steps similar to those in the first example described above are performed; as shown in FIG. 7 (*a*)-(*e*), the fourth sheet S4 is stamped into the shape of the substrate 11 and laminated on the first intermediate layer 15A formed on the substrate 11, and another stamped fourth sheet S4 is laminated thereon repeatedly, and lastly a cover layer 16 is laminated thereon, so that a multilayer optical information recording disk 10 as shown in FIG. 1 can be manufactured.

In the second example of the method described above, as well, the fourth sheet S4 is stamped into the shape of the substrate 11 when used, but the present invention is not limited to this process. For example, in the thermal imprint device 40 shown in FIG. 10, the molds 41 or the endless belts 42 may be configured to include a stamping blade, so that in the thermal imprint process, formation of the groove 14A and stamping of the recording layers 14 and the intermediate layer 15 into a disc-like shape may be performed at the same time by a single step, so as to form slits 14C in the recording layers 14 and the intermediate layers (not shown). In this configuration, the resin sheet RS has already been stamped into the disc-like shape, the step for obtaining the fourth sheet S4 may be carried out by laminating the stamped disc-like second sheet S2 on respective stamped portions (respective groove formation areas 14G) to obtain fourth sheets S4 (see FIG. 9 (*c*), (*d*)).

It is understood that the stamping operation performed on the resin sheet RS in such a manner that areas surrounding the groove formation areas 14G (corresponding to non-use areas 14D in FIG. 12(*a*)) are joined together as shown in FIG. 12(*b*) makes it possible to separate the non-use areas 14E from the use areas (groove formation areas 14G) together in one operation. Also in the first example of the method as well, the stamping operation performed in such a manner that areas surrounding the groove formation areas 14G are joined together as shown in FIG. 12(*b*) makes it possible to separate the non-use areas 14E from the second release sheet 22 together in one operation.

In the above-described two examples of the method, the multilayer optical information recording disk 10 is manufactured by following the steps of: forming a first intermediate layer 15A over a substrate 11, then laminating a fourth sheet S4 thereover repeatedly, and lastly laminating a cover layer 16 thereover; however, the present invention is not limited to this specific process steps. For example, the multilayer optical information recording disk 10 may also be manufactured by following the steps of: laminating a first intermediate layer 15A of a fourth sheet S4 over a substrate 11, laminating another fourth sheet S4 thereover repeatedly, thereafter forming a first intermediate layer 15A (adhesive layer) over a recording layer 14 of an uppermost fourth sheet S4, and laminating a cover layer 16 thereover. Alternatively, the multilayer optical information recording disk 10 may be manufactured by following the steps of: laminating a first intermediate layer 15A of a fourth sheet S4 over a substrate 11, laminating another fourth sheet S4, and thereafter laminating a first intermediate layer 15A of a cover layer 16 having a first intermediate layer 15A (adhesive layer) formed thereon over a recording layer 14 of an uppermost fourth sheet S4.

In the above-described two examples of the method, heating in the thermal imprint process is targeted at the mold, but the present invention is not limited to this heating scheme; for example, the recording layer 14 (or sheet including the recording layer 14) may be subjected to heat, or the both of the mold and the recording layer 14 may be subjected to heat.

According to the above-described method for manufacturing a multilayer optical information recording disk 10, a multilayer optical information recording disk 10 in which each of the recording layers 14 has a groove 14A can be manufactured; thus, the track-following servo control and the recording/reading operation can be performed by a single laser beam, and accurate tracing of the tracks in the recording layers 14 is ensured. Moreover, since the groove 14A can be formed in each recording layer 14 easily by the thermal imprint process, the multilayer optical information recording disk 10 in which each of the recording layers 14 has a groove 14A can be manufactured at a relatively low cost.

Although the exemplary embodiment of the present invention has been described above, the present invention can be implemented in an appropriately modified form without limitation to the above-described embodiment.

For example, in the above-described embodiment, the recording layer 14 is configured to include a polymer binder and a dye dispersed in the polymer binder, but the present invention is not limited to this configuration; the recording layer may be configured to include a polymer to which a dye is bonded. To be more specific, the polymer to which a dye is bonded consistently applicable to the present invention may include a polymer having a structure represented by the following general formula (2).

[Chem. 3]

General Formula (2)

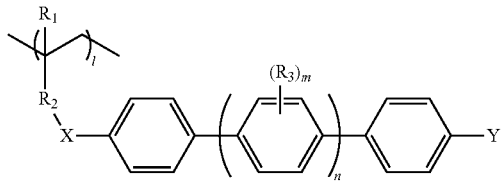

In the general formula (2), Y represents a substituent having a Hammett's sigma-para value (σp value) of 0 or more, X also represents the same kind of substituent. X and Y may be the same as or different from each other. n represents an integer of 1 to 4; $R_1$, $R_2$, $R_3$ represent substituents, which may be the same as or different from one another; l represents an integer not less than one; and m represents an integer of 0 to 4.

In the above-described embodiment, one of the intermediate layers 15 adjacent to the recording layer 14 (i.e., first intermediate layer 15A) only is made of adhesive, but the present invention is not limited to this specific configuration; rather, all the intermediate layers 15 disposed adjacent to both sides of the recording layer 14 may be made of adhesive, wherein the intermediate layers 15 made of adhesive and the recording layers 14 are alternately arranged between the substrate 11 and the cover layer 16. In this configuration, to suppress interlayer cross talk, the thickness of one recording layer 14 may be preferably not less than 2 micrometers, more preferably not less than 5 micrometers, further preferably not less than 7 micrometers. Although no upper limit of the thickness of the recording layer 14 should be placed, as long as no interlayer cross talk is produced, the thinner, the better it may be in order to maximize the number of the recording layers 14; for example, the thickness not more than 20 micrometers may be preferable. In this configuration, the grooves 14A for track-following servo control are formed on the both interfaces 18 at both sides of the recording layers 14, and such a recording layer 14 having grooves 14 on both interfaces 18 may be formed, for example, by a thermal imprint process using a recording layer sheet 14S consisting of a recording layer 14 only as shown in FIG. 13(b), instead of the resin sheet RS used in the thermal imprint process for the above-described second example of the method (see FIG. 9(b)).

Provision of intermediate layers 15 made of adhesive on both sides of the recording layers 14 makes it possible to form recording marks M (protrusions) on the both interfaces 18 of the recording layers 14. Accordingly, assuming, for example, that the number of the recording layers 14 is the same as that of the recording layers 14 provided in the above-described multilayer optical information recording disk 10, the storage capacity can be increased; even when the number of the recording layers 14 is smaller than that of the recording layers 14 provided in the above-described multilayer optical information recording disk 10, the storage capacity comparable to that of the above-described multilayer optical information recording disk 10 can be achieved.

In the above-described embodiment, information is recorded (recording marks M are formed) at the land 14b between adjacent grooves 14A formed in the recording layer 14, but the present invention is not limited to this specific configuration; rather, the multilayer optical information recording disk consistent with the present invention may be configured such that information is recorded in the grooves, while track-following servo control is exercised using the land between adjacent grooves.

Example

Next, a description will be given of an experiment in which it has been confirmed that a groove can be formed in a surface of a recording layer by a thermal imprint process.
<Making of a Multilayer Sheet>

A multilayer sheet consisting of a recording layer (Tg: 73° C.) and an intermediate layer (made of adhesive) was made by the method described below under the conditions specified below. The multilayer sheet used for this example is configured to have a layered structure provided on a second release sheet (thickness: 38 micrometers), which structure includes a first intermediate layer, a recording layer (hereinafter referred to as "first recording layer"), a second intermediate layer, and a recording layer (hereinafter referred to as "second recording layer"), arranged from the second release sheet in this order (this is the same configuration as that of the fourth sheet S4 shown in FIG. 6(b) except that no groove 14A is formed therein).

The second intermediate layer was formed by preparing its material and applying the same on the first release sheet. First, 79 parts by mass of acrylic resin EA-F5003 (manufactured by Osaka Gas Chemicals Co., Ltd.), 21 parts by mass of acrylic resin M-310 (manufactured by Toagosei Co., Ltd.) and 3 parts by mass of photopolymerization initiator IRGACURE 184 (manufactured by Ciba AG) were mixed through five-hour agitation, and the material (UV curable resin) for the second intermediate layer was prepared. Thereafter, the UV curable resin was applied onto a first release sheet HY-NS80 (manufactured by Higashiyama Film Co., Ltd.) by a blade, and irradiated with ultraviolet rays using a High pressure UV lamp UM-102 (manufactured by Ushio Inc.); in this way, the second intermediate layer was formed.

The first recording layer was formed by preparing its material and applying the same to the second intermediate layer. First, 63 parts by mass of polymethyl methacrylate (manufactured by Sigma-Aldrich Japan Co., LLC.) as a polymer binder, and 37 parts by mass of 2,2',4,4'-tetrahydroxybenzo phenone (manufactured by Sigma-Aldrich Japan Co., LLC.) as a light absorption material (dye) were added to 2,200 parts by mass of a solvent of 2-buthanone (manufactured by Wako Pure Chemical Industries, Ltd.) and dissolved therein through 20-hour agitation, and a recording layer application liquid was prepared. Thereafter, the recording layer application liquid was applied to the second intermediate layer by a blade, and dried in an oven at 100° C. for three minutes; in this way, the first recording layer was formed.

The first intermediate layer was provided from an adhesive sheet DA-3010 (manufactured by Hitachi Chemical Co., Ltd.) having a thickness of 10 micrometers which was sandwiched between a pair of release sheets (one of which is a second release sheet). The other of the release sheets ("light" releasability sheet) was removed from the adhesive sheet, and the adhesive sheet was laminated on the first recording layer using a laminator RSL-382S (manufactured by Japan Office Laminator Co., Ltd.).

The second recording layer was formed by removing the first release sheet from the second intermediate layer, applying the aforementioned recording layer application liquid to the second intermediate layer by a blade, and drying the same in an oven at 100° C. for three minutes.

The thicknesses of the respective layers were measured using a stylus profiler DektakXT (supplied by ULVAC, Inc.); the results of measurement were: the second intermediate layer was 10 micrometers in thickness, and each of the first and second recording layers was 0.4 micrometers in thickness.

<Thermal Imprint Process>

The thermal imprint process was performed for the second recording layer by the method described below under the conditions specified below. In this example, the thermal imprint process was not performed for the first recording layer.

A nickel mold was made by electroforming. The transfer surface of the mold was shaped like a disc having a radius of 69 mm, and had a protrusive shape with a profile reverse to the shape of the groove, formed within an annular region defined by two circles having radii of 24 and 58 mm. The mold had a single-spiral land-and-groove pattern, and the land was 320 nm in width, 60 nm in height, and 640 nm in pitch.

The surface of the mold was subjected to treatment for improved releasability which includes: immersing the mold in Optool 2100 (manufactured by Daikin Industries, Ltd.), and immersing and rinsing the same with a fluoric solvent HD-TH (manufactured by Daikin Industries, Ltd.), to form a monomolecular fluoric film on the surface of the mold.

The mold was put on the second recording layer, subjected to evacuation, and heated. After the temperature reached 70° C., pressure was raised to 3 MPa and kept for three minutes. Thereafter, the temperature was lowered to 35° C. and the pressure was released; finally, the mold was released from the second recording layer.

<Measurements>

The surface of the second recording layer subjected to the thermal imprint process was measured by an atomic force microscope (AFM) under the following conditions:

Device: Scanning Probe Microscope OLS3500 (manufactured by Olympus Corporation)

AFM probe: AR5-NCHR-20 (manufactured by NanoWorld AG)

Measurement mode: Dynamic mode

Scan range: 2 micrometers×2 micrometers

<Results of Experiment>

As shown in FIG. 14 (a), (b), observation of the surface of the second recording layer subjected to the thermal imprint process using the AFM showed that a groove was formed in the surface of the second recording layer (see a portion seen dimmed in FIG. 14 (a)). The width of the groove was approximately 0.36 micrometers, the width of the land was approximately 0.30 micrometers, the distance from the center of the groove to the center of the land on either side of the groove in the radial direction was approximately 0.33 micrometers, and the depth of the groove was approximately 50 nm.

What is claimed is:

1. A method for manufacturing a multilayer optical information recording disk comprising a plurality of recording layers and intermediate layers provided between the plurality of recording layers, the method comprising the steps of:
    forming the groove in a surface of each of the plurality of recording layers by a thermal imprint process each of the recording layers including a polymer binder and a dye dispersed in the polymer binder or including a polymer to which a dye is bonded;
    forming an intermediate layer made of adhesive, on the surface of each of the plurality of recording layers with the groove formed therein, to obtain multilayer sheets each consisting essentially of one recording layer and one intermediate layer; and
    laminating the multilayer sheets together.

2. A method for manufacturing a multilayer optical information recording disk comprising a plurality of recording layers and intermediate layers provided between the plurality of recording layers, wherein the intermediate layers include first and second intermediate layers disposed adjacent to first and second sides, respectively, of the plurality of recording layers, the first intermediate layer being made of adhesive, and the second intermediate layer being harder than the first intermediate layer, the method comprising the steps of:

providing a first release sheet and a second release sheet;

forming a second intermediate layer and a first recording layer in this order on the first release sheet, each of the first recording layers including a polymer binder and a dye dispersed in the polymer binder or including a polymer to which a dye is bonded;

forming the groove in a surface of the first recording layer by a thermal imprint process to obtain a first sheet;

forming a first intermediate layer on the second release sheet to obtain a second sheet;

laminating the first intermediate layer and the first recording layer, thereby forming a laminate consisting of the second sheet and the first sheet to obtain a third sheet;

removing the first release sheet from the third sheet, and forming a second recording layer on an exposed surface of the second intermediate layer of the third sheet, each of the second recording layers including a polymer binder and a dye dispersed in the polymer binder or including a polymer to which a dye is bonded;

forming the groove in an exposed surface of the second recording layer by the thermal imprint process to obtain a fourth sheet; and removing the second release sheet from the fourth sheet, and laminating, on an exposed surface of the first intermediate layer of the fourth sheet, a second recording layer of another fourth sheet.

3. A method for manufacturing a multilayer optical information recording disk comprising a plurality of recording layers and intermediate layers provided between the plurality of recording layers, wherein the intermediate layers include first and second intermediate layers disposed adjacent to first and second sides, respectively, of the plurality of recording layers, the first intermediate layer being made of adhesive, and the second intermediate layer being harder than the first intermediate layer, the method comprising the steps of:

providing a second intermediate layer and a release sheet;

forming first and second recording layers on respective sides of the second intermediate layer, each of the first and second recording layers including a polymer binder and a dye dispersed in the polymer binder or including a polymer to which a dye is bonded;

forming the groove in a surface of each of the first and second recording layers concurrently by a thermal imprint process;

forming a first intermediate layer on the release sheet to obtain a fifth sheet;

laminating the first intermediate layer of the fifth sheet on the first recording layer to obtain a sixth sheet; and removing the release sheet from the sixth sheet, and laminating, on an exposed surface of the first intermediate layer of the sixth sheet, a second recording layer of another sixth sheet.

4. The method according to claim 1, wherein the thermal imprint process includes heating at least one of an imprint mold and a corresponding recording layer up to a temperature range of Tg ±25° C. where Tg is a glass transition temperature of the recording layer in degrees Celsius.

5. The method according to claim 1, wherein the thermal imprint process includes pressing an imprint mold against a corresponding recording layer at a pressure not lower than 0.1 MPa.

6. The method according to claim 2, wherein the step carried out to obtain the fourth sheet includes the steps of (1) pressing an imprint mold against the second recording layer to form the groove in the surface of the second recording layer, and (2) cutting a laminate including the first and second recording layers and the first and second intermediate layers into a predetermined shape, the steps (1) and (2) being performed simultaneously in one operation.

7. The method according to claim 2, wherein the thermal imprint process includes heating at least one of an imprint mold and a corresponding recording layer up to a temperature range of Tg ±25° C. where Tg is a glass transition temperature of the recording layer in degrees Celsius.

8. The method according to claim 2, wherein the thermal imprint process includes pressing an imprint mold against a corresponding recording layer at a pressure not lower than 0.1 MPa.

9. The method according to claim 3, wherein the thermal imprint process includes heating at least one of an imprint mold and a corresponding recording layer up to a temperature range of Tg ±25° C. where Tg is a glass transition temperature of the recording layer in degrees Celsius.

10. The method according to claim 3, wherein the thermal imprint process includes pressing an imprint mold against a corresponding recording layer at a pressure not lower than 0.1 MPa.

* * * * *